United States Patent [19]

Saar

[11] 4,267,914
[45] May 19, 1981

[54] ANTI-KICKBACK POWER TOOL CONTROL

[75] Inventor: David A. Saar, Timonium, Md.

[73] Assignee: Black & Decker Inc., Newark, Del.

[21] Appl. No.: 33,661

[22] Filed: Apr. 26, 1979

[51] Int. Cl.³ .................... F16D 43/20; F16D 43/24; F16D 67/02

[52] U.S. Cl. .................................... 192/147; 81/470; 83/62; 91/42; 91/59; 173/12; 192/0.033; 192/0.034; 192/2; 192/3 R; 192/56 R; 192/103 R; 318/275; 318/461

[58] Field of Search ............... 192/0.032, 0.033, 0.034, 192/1, 2, 3 R, 12 R, 12 C, 12 D, 17 R, 17 A, 17 C, 18 R, 18 A, 18 B, 56 R, 150, 103 R, 103 C, 103 F, 144, 147; 173/12; 81/52.4 R, 52.4 A, 52.4 B; 91/41, 59, 42; 251/136; 318/275, 461, 463, 464; 188/137; 83/58, 62

[56] References Cited

U.S. PATENT DOCUMENTS

| | | |
|---|---|---|
| 1,184,826 | 5/1916 | Cooper . |
| 1,433,712 | 10/1922 | Fortescue . |
| 1,522,262 | 1/1925 | Parker . |
| 1,753,958 | 4/1930 | West . |
| 4,023,406 | 5/1977 | Benz, Jr. ............................ 173/12 X |
| 4,026,369 | 5/1977 | Vliet .............................. 81/52.4 B X |
| 4,040,117 | 8/1977 | Houser ................................... 361/33 |
| 4,110,829 | 8/1978 | Boys ................................... 173/12 X |

FOREIGN PATENT DOCUMENTS 2651905 5/1977 Fed. Rep. of Germany ........ 81/469
1211133 11/1970 United Kingdom ............. 192/56 R Primary Examiner—Allan D. Herrmann
Attorney, Agent, or Firm—Leonard Bloom; Edward D. Murphy; Harold Weinstein

[57] ABSTRACT

An impending kickback condition is the operation of a power tool or machine tool system is sensed and used to control or eliminate the kickback. The ability to sense an impending kickback condition can be used in all categories of power driven tools. The change in force applied to the power driven tool or other implement is monitored by measuring the rate of change of speed of the tool or implement, and if the speed is decreasing, the rate of change of speed is compared with a threshold value which may be either preset or variable. If this threshold value is exceeded, an output control signal is generated which inhibits the coupling of power to the tool or other implement and/or applies a brake to stop the tool or implement. In order for power to once again be coupled from the motive power source to the shaft, the start switch must be opened and then reclosed or some other signal provided by the operator or another predetermined condition must be met.

46 Claims, 19 Drawing Figures

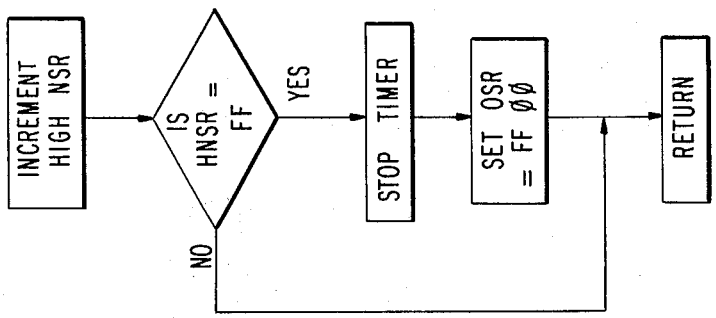
FIG.5C TIMER INTERRUPT ROUTINE
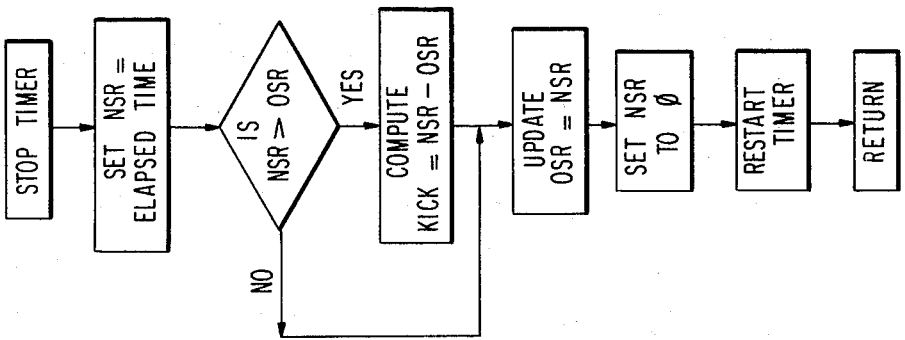
FIG.5B EXTERNAL INTERRUPT ROUTINE
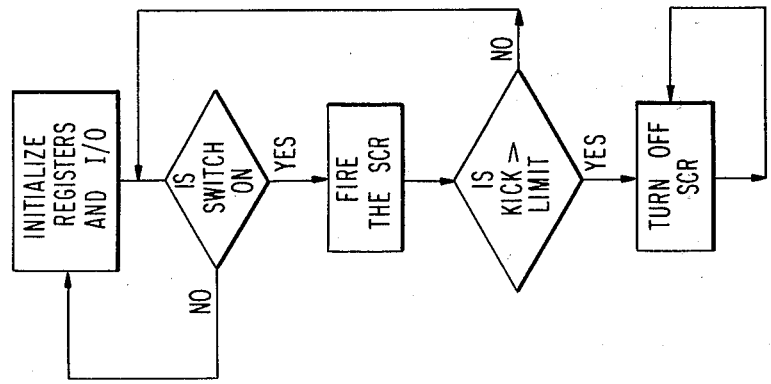
FIG.5A MAIN PROGRAM KICKBACK CONTROL

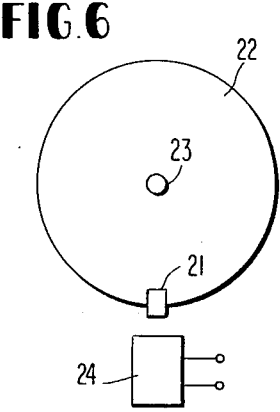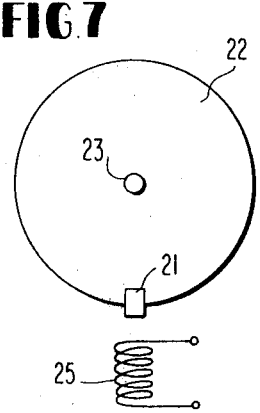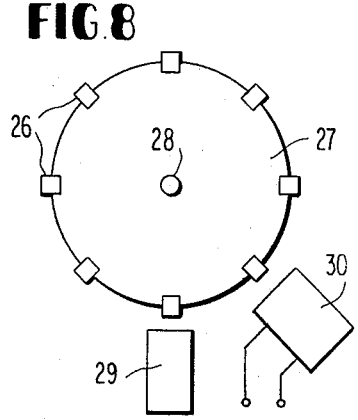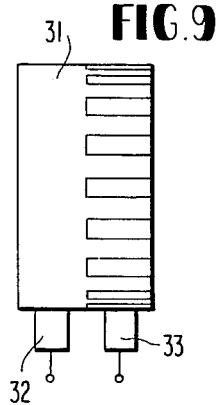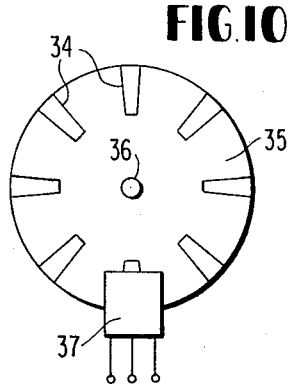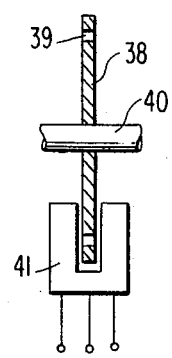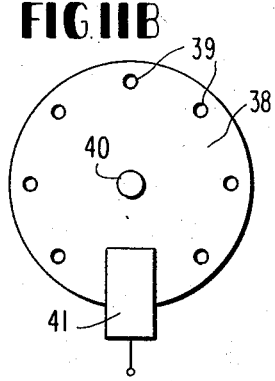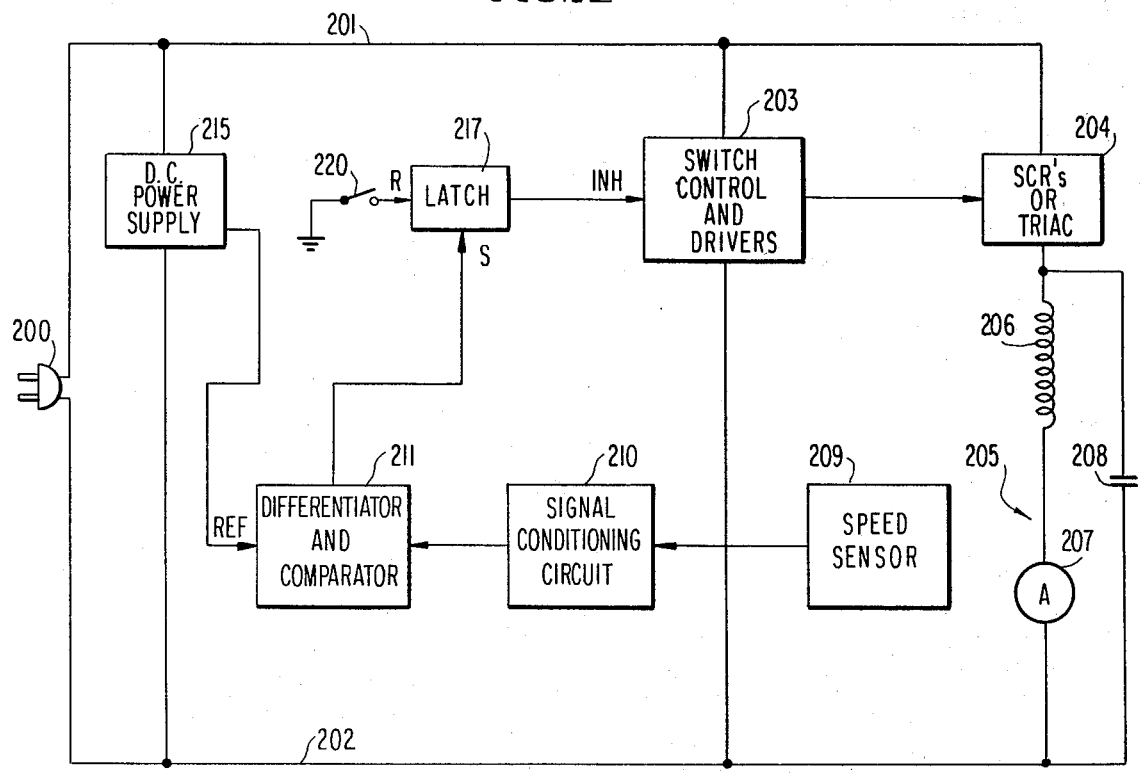

ANTI-KICKBACK POWER TOOL CONTROL

BACKGROUND OF THE INVENTION

The present invention generally relates to safety devices for power driven tools and machine tool systems, and more paticularly, to an anti-kickback power tool control method and system which is capable of sensing a significant and rapid change in the load on the tool and turning off the power to the tool and/or applying a brake before lock-up occurs between the tool or implement and the workpiece. As used herein, the term "implement" means the tool or implement which is driven by the motive power source of the power tool, Thus, the term "implement" includes such devices as saw blades or chains, drill and router bits, abrasive wheels and the like. The terms "power tool", "machine tool" and similar terms refer to the total combination including the motive power source and the driven implement.

Kickback is defined as that condition when the power driven tool or other implement abnormally and rapidly engages the workpiece in such a manner as to transfer at a high rate the power of the motive power source and/or the inertial energy of the power tool to the power tool or the workpiece or both resulting in an undesired and generally uncontrolled motion of the power tool or the workpiece or both. Kickback can be caused by a variety of factors including but not limited to sudden or excess force by the operator, nonuniform hardness or a defect in the workpiece, and where the workpiece is wood or other cellular material, the accumulation of moisture. In the case of a saw, the kerf may close and pinch the blade to cause a kickback, and in the case of a drill, kickback may occur when the bit breaks through the workpiece.

Consider, for example, a portable circular saw of the type used on construction sites. Typically, plywood sheathing is first nailed to a framing structure, such as roofing trusses, and then the projecting ends of the plywood are sawed off evenly. If in this process a kickback were to occur due to the kerf closing as the ends of the wood sag under their own weight, the portable circular saw could kick out of the workpiece and fly back toward the operator, possibly resulting in serious bodily injury. On the other hand, in the case of a bench saw or a radial saw where the workpiece is fed into the saw blade, a kickback would result in the workpiece being driven back toward the operator at a high rate of speed, again with the possibility of serious bodily injury. It will be understood by those familar with the art that kickback is not a condition which is limited to circular saws but may be experienced with any power driven tool or machine tool system. For example, kickback may occur with portable, bench or stationary power drills, routers and shapers, portable and bench planers, abrasive wheel grinders, milling machines, reciprocating saws and the like. All of these tools may be typically driven with electrical motors, including universal, D.C. single phase or polyphase motors, but kickback is not a condition dependent on the motive power source but rather on the abnormal engagement of the tool or other implement with the workpiece as defined above. Thus kickback is a potential hazard with any cutting power tool whether driven by an electric motor, a pneumatic motor, an internal combustion engine or any other motive power source. In fact, kickback is an especially dangerous hazard in chain saws which are most typically driven by small internal combustion gasoline engines.

There have been many attempts to eliminate or reduce the hazards of kickbacks in power tools. For example, in bench saws and in radial arm saws, a plurality of freely rotating pawls carried on an adjustable support with the support clamped to the saw bench or frame been provided. In use, the pawls are adjusted downwardly toward the workpiece so that the workpiece as it is fed to the cutting edge of the saw blade pushes the pawls upwardly and freely passes under the pawls. In the event of the kickback, the pawls are designed to dig into the surface of the workpiece to prevent the workpiece from being kicked back toward the operator. This anti-kickback device is generally effective, but may damage the workpiece.

In the case of chain saws where kickback is especially dangerous, two approaches are currently in use. The first approach is bases on the determination that most kickbacks occur when the workpiece is engaged by the cutting chain as it traverses the end of the guide bar. To prevent this from happening, some chain saws have been equipped with a protective cover for the cutting chain at the extreme end of the guide bar. The second approach to anti-kickback protection in a chain saw employs a chain brake designed to be actuated when a kickback occurs. Typically, the chain brake is operated by the deflection of a lever which hits the operator's hand due to motion of the saw in kickback.

SUMMARY OF THE INVENTION

It is therefore an object of this invention to provide an improvement in anti-kickback power tool control methods and systems which may be used in all types of power cutting tools, including stationary, bench and portable tools, irrespective of the motive power source used.

It is another object of the present invention to provide an anti-kickback power tool control which may be incorporated into the power tool and requires no adjustment or operation by the operator and which cannot be defeated by the operator.

It is a further object of the present invention to provide the ability to sense an impending kickback condition in the operation of a power tool or machine tool system.

These and other objects of the invention are achieved in a novel anti-kickback control method and system. An operator or start switch is typically closed to enable a motive power source to supply power to a shaft connected to drive a tool or other implement. This operator or start switch may take the form of a trigger switch in a portable tool, a rocker switch in a bench tool, a remotely operated switch in a stationary tool or a throttle control in a chain saw. The anti-kickback control monitors the change of force or torque applied to the implement by measuring the rate of change of speed of the tool or implement. This rate of change is compared with a threshold value, and if the threshold value is exceeded, an output control signal is generated which turns off the power to the tool and/or applies a brake. The threshold may be preset, predetermined or dynamically variable. Alternatively, when the threshold is exceeded the direction of motion of the shaft may be reversed or the direction of torque may be reversed. In order to again apply power to the shaft, the operator or start switch must be opened and then closed again or some other signal provided by the operator or another predetermined condition must be fulfilled.

The invention is based on the discovery that in the early stages of tool kickback, there is a significant and rapid change in the load on the tool. This can be measured as an increase in force or torque which can be reflected in a decrease in motor speed. Kickback is not instantaneous. For example, in wood as a workpiece, kickback may take anywhere from 10 to 200 milliseconds (ms) before lock-up occurs between the implement and the workpiece. The present invention detects the impending lockup as a rapid decrease in rotary shaft speed and turns off the power to the tool and/or applies a brake before lockup occurs. In prototypes which have been tested, the worst case detection time plus action time has been 16.6 milliseconds which has been sufficiently fast to be effective for the power tool and workpiece tested. With the present state of the art, this time could be easily reduced by at least an order of magnitude so that detection time plus action time can be short enough to prevent kickback in almost any environment.

In the normal operation of the power tool, there are speed variations when the tool implement engages and disengages the workpiece. More particularly, the maximum normal deceleration of the power tool is a function of the work load and motor power and, to a lesser extent, the tool inertia. If the motive power source is an internal combustion engine, the maximum normal deceleration is also a function of the compression braking of the engine. On the other hand, the maximum normal acceleration of the power tool is primarily a function of the motor power and the tool inertia. The powe tool/workpiece system can be analyzed in terms of the energy in the system using the following variables:

$U_1$ = energy generated from inertia (in.-lb.)
$U_1 = \frac{1}{2} I \omega_o^2$, where I is the moment of inertia of the system and $\omega_o$ is velocity
$U_2$ = energy generated from electro-magnetic field (in.-lb.)
$U_2 = \int P dt = \overline{P} t_s$, where $\overline{P}$ is average power output and $t_s$ is duration of lock-up
$U_3$ = energy absorbed by system before kickback (in.-pd.)
$U_3 = \frac{1}{2} I (\Delta \omega)^2 + (\overline{P}_a)(t_a)$, where $\Delta \omega$ is change in velocity during energy absorbing period, $\overline{P}_a$ is average watts output during energy absorbing period, and $t_a$ is duration of energy absorbing period
$U_4$ = energy in kickback (in.-lb.)

More specifically, the system energy equation is as follows:

$$U_1 + U_2 = U_3 + U_4 \quad (1)$$

Equation (1) may be rewritten in terms of the energy in kickback $U_4$ as follows:

$$U_4 = U_1 + U_2 - U_3 \quad (2)$$

As will become clear from the following detailed description of the preferred embodiments of the invention, the addition of the anti-kickback control according to the invention results in a modification of equation (2) as follows:

$$U_4 = U_1 - U_3 \quad (3)$$

This is due to the fact that $U_2 \to 0$ when the power or other input is cut off at the beginning of lock-up. From emperical observation, it has been determined that typically $U_1 \simeq U_3$, and therefore $U_4 \to 0$.

When the tool or other implement engages the workpiece, inertial energy plus drive energy is transferred to the workpiece causing a reduction in tool speed. The absolute value of the slope of the speed normally will not exceed a value determined by the motor power plus a small contribution of inertia. Thus, the antikickback power tool control according to the present invention does not react to relatively small or slow changes of speed which occur in normal operations. The kickback problem occurs when the transfer of inertial energy becomes large in a very short period of time, on the order of 10 to 100 ms. This results in a very rapid decrease in speed which is detected by the anti kickback power tool control to remove the power to the tool and/or apply a brake.

As a specific illustration of the manner in which the invention is used to sense a change in speed, consider the following example. The rate of change of speed, and specifically in this case a deceleration, in terms of the time elapsed in succeeding revolutions of a tool shaft is described in terms of the following equation:

$$\alpha \simeq -2\pi \frac{\Delta t}{t^3} \quad (4)$$

where:
$\alpha$ to is deceleration in rad./sec.$^2$,
$\Delta t = t_2 - t_1$, in sec.,
$t = \frac{1}{2}(t_2 + t)$, in sec.,
and $t_1$ is time in sec. elapsed during one revolution and $t_2$ is time in sec. elapsed during the next revolution.

Example: $t_1 = 3.00$ ms
$t_2 = 3.06$ ms
$\Delta t = 3.06 - 3.00 = 0.06$ ms
$t = \frac{1}{2}(3.06 + 3.00) = 3.03$ ms $$\alpha = 2\pi \frac{0.06 \times 10^{-3}}{(3.03 \times 10^{-3})^3} = -1.355 \times 10^4 \text{ rad./sec.}^2$$

Implementation of the invention may be either digital or analog. A digital implementation has been constructed using a commerically available microcomputer. In this case, the speed monitor was a Hall effect speed sensor made by placing a small magnet on the outer edge of the universal motor fan and placing the Hall effect sensor proximate to the outer periphery of the fan blade so that the magnet passes a Hall effect sensor once each revolution of the universal motor to produce a pulse. The pulses generated by the Hall effect speed sensor are supplied to the microcomputer which makes periodic speed readings by counting the output of an internal clock between pulses. In other words, speed is measured as a function of elapsed time. In order to compute the rate of change of the speed of the motor shaft, the previous or old (time) speed reading ($t_1$) is subtracted from the most recent or new speed (time) reading ($t_2$) to produce a difference speed reading ($\Delta t$). This difference speed (time) reading if positive, indicating a decrease in speed (increase in time), is compared with a threshold value. If the difference speed reading exceeds the threshold value, the microcomputer generates an output control signal which inhibits the firing of the semiconductor switches that supply current to the universal motor. Alternatively, in an analog implementation for a portable power tool employing a universal motor and semiconductor switching circuits to control the speed of the universal motor, the speed of the motor may be monitored using, for example, a tachometer which produces a voltage proportional to the motor speed. This voltage signal is differentiated to produce a rate of change signal which is compared with a threshold signal. The comparison may be effected by a comparator which produces an output pulse if the rate of change signal exceeds the threshold signal. The output pulse from the comparator is used to set a latch or a bistable circuit which then produces an inhibiting signal that prevents the firing of the semiconductor switches which supply current to the universal motor. The latch is reset by opening and then closing the manually operated switch on the power tool.

While in the case of many electrical motor driven power tools it may be sufficient only to turn off the power to the electric motor, in the case of an internal combustion engine or the like, a similar effect can be achieved by disengaging a clutch connecting the engine to the cutting tool shaft. However, simply turning off the power to the tool or disengaging the clutch providing the drive power to the tool may not be enough depending on the size and speed and, hence, inertia of the tool. For larger tools and chain saws, it may be additionally desirable to apply a brake. Any conventional brake, including electomagnetic brakes and friction brakes, may be used. Alternatively, in some applications it may be desirable to reverse the direction of motion or torque of the power driven tool or other implement.

BRIEF DESCRIPTION OF THE DRAWINGS

The invention will be better understood from the following detailed description of the invention which makes reference to the accompanying drawings, in which:

FIGS. 5A, and 5B and 5C are flow diagrams of the program used in the microcomputer of the digital embodiment shown in FIG. 4;

FIG. 6 is a plan view of a speed sensor employing a Hall effect plate or magneto diode;

FIG. 7 is a plan view of a speed sensor of the magnet/coil pulse generating type;

FIG. 8 is a plan view of a speed sensor of the variable reluctance type;

FIG. 9 is a side view of a commutator speed sensor;

FIG. 10 is a plan view of a reflective optical speed sensor;

FIG. 11A is a side view and FIG. 11B is a plan view of a transmissive or "chopper " type opticl speed sensor;

FIG. 12 is a block and schematic diagram illustrating an analog embodiment of the invention;

DESCRIPTION OF THE PREFERRED EMBODIMENTS

Figure 1:
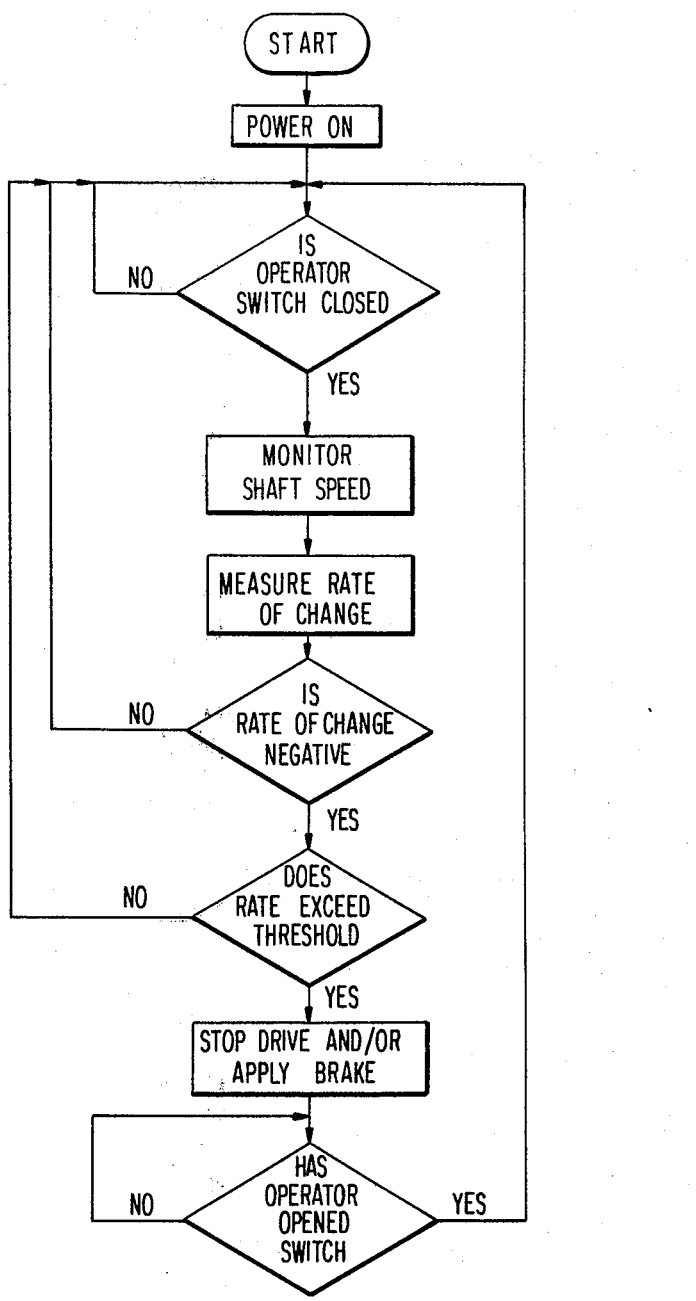
FIG. 1 is a flow diagram illustrating the general operation of the subject invention.

As will become apparent from the following detailed description, the present invention may be implemented using either digital or analog techniques; however, the method of operation of the invention is the same irrespective of a particular hardware implementation. This method of operation is illustrated by the flow diagram shown in FIG. 1 of the drawings. The first step in the flow diagram is the balloon labeled START. This may occur, for example, when the power cord of the power tool is plugged in to an AC outlet resulting in the POWER ON condition in the second step of the flow diagram. Once power is applied to the power tool, the tool may be turned on or off with an operator or start switch as in any conventional power tool. Once the operator or start switch has been closed, the first operation to be performed is to monitor the shaft speed of the motor driven shaft which carries the implement. A tachometer can be used to develop an output signal which is proportional to shaft speed or a pulse generator can be used to provide an output having a pulse repetition frequency which is proportional to shaft speed. If a pulse generator is used, the time between pulses can be counted as a measure of speed, time and speed being inversely proportional.

Having developed a signal proportional to the shaft speed, the next operation is to measure the rate of change of the shaft speed. In purely mathematical terms, this simply amounts to differentiating the shaft speed to obtain a measure of the shaft acceleration or deceleration. Differentiation of an analog signal proportional to the shaft speed is readily acomplished using a series capacitor or high-pass filter, but, as will be described in more detail hereinafter, the preferred method is to use an aperational amplifier with an input capacitor. Digitally, the rate of change is approximated by periodically sampling the speed of the shaft by using a timer and then computing the difference between subsequent time measurements. This approximation can be made quite accurate depending on the sampling intervals and the number of significant places of the speed reading. As a practical matter an 8-bit microcomputer having cycle times of 2.5 microseconds or less provides both adequate accuracy and sufficient speed of computation to implement the present invention.

Once the acceleration or deceleration of the shaft has been measured, it is really only necessary to examine shaft decelerations. Therefore, the next operation in the flow diagram is to ask whether the rate of change is negative corresponding to a deceleration. If it is not, then, according to the flow diagram, the method of operation of the invention returns to checking the state of the operator switch and monitoring the shaft speed. However, if the rate of change is negative, that is, a deceleration has been measured, then it is necessary to compare that deceleration with a threshold value. Now it should be understood that in the normal operation of the power tool, there will be a deceleration of the tool implement any time it engages a workpiece. This deceleration, however, will be within allowable and predictable limits. Even in the case of an overload condition when the implement decelerates to some relatively low rate the deceleration is still much less than that which occurs in a kickback condition just prior to lockup of the tool implement with the workpiece. In fact, in the overload condition, the power driven tool or other implement continues to cut the workpiece but at a slower speed, with the result that a thermal circuit breaker may be tripped if the motive power source of the power tool is an electric motor or the engine stalls in the case that the motive power source of the power tool is an interanal combustion engine. Neither of these conditions will occur in kickback. Kickback occurs in a such a short period of time that in the case of an electric motor, no significant heating takes place such that a thermal relay would trip, or in the case of an internal combustion engine, the inertia of the engine flywheel is sufficient to prevent stalling. The threshold value should be set at a level which will permit detection of a kickback condition in a sufficiently short period of time to allow action to be taken to prevent lockup between the power driven tool and the workpiece. This will vary depending on the motive power source, total inertia of the power tool and the normal operating speed of the tool, but this may be readily established by routine tests for any given power tool. Moreover, the threshold value need not be a preset or predetermined value but may be varied with operating conditions such as speed of the tool by a more complex control system.

It is important to note here that wile it is desirable to detect a kickback condition in a relatively short period of time, the principle criteria is to detect the kickback condition and take some action such as turning off the power and/or applying a brake in a period of time which is shorter than the period of time it takes for actual lockup of the power driven tool or other implement with the workpiece. With wood as a workpiece, lockup may take place in as short a period of time as 10 milliseconds or as long a period of time as 200 milliseconds or more. Therefore, it is generally sufficient to specify that detection of the kickback condition plus action time to prevent kickback be made in a period of time of less than 10 milliseconds. In a typical implementation, the time it takes to detect a kickback condition can be varied by adjusting the level of a theshold voltage signal. By making the level relatively small, a kickback condition can be detected in a relatively short period of time, but, in addition, there may be false detections which are not desirable. In practical implementations of the invention, this has not been a problem because the threshold level can be set sufficiently high as to avoid false detections and yet detect a kickback condition in a sufficiently short period of time to allow some action to be taken to prevent the kickback.

If the rate of change of the shaft speed is negative but does not exceed the threshold, the operation of the invention as shown in FIG. 1 is to return to checking the operator switch and monitoring the shaft speed. However, if the rate of change of the shaft speed is both negative and exceeds the threshold, then a kickback condition has been detected. At this point in the method of operation of the invention, the drive to the shaft is stopped and/or a brake is applied. Alternatively, the direction of motion of the shaft may be reversed or the direction of applied torque may be reversed. In electric motor driven tools, particularly hand tools and light-duty bench tools, it is generally sufficient to cease supplying current to the electric motor. Likewise, in relatively light-duty pneumatic motor or internal combustion engine driven power tools, it may be sufficient only to disengage a clutch between the pneumatic motor or internal combustion engine and the shaft which carries the tool implement. On the other hand, in very large industrial equipment drive by polyphase electric motors and in some internal combustion engine driven tools, particularly chain saws, it may be necessary to not only stop the drive to the power tool but also apply a brake to the power driven tool or implement. The manner in which this is done is straightforward and conventional. What the invention accomplishes is the detection of the beginning of a kickback condition so that the drive can be stopped or reversed and/or a brake applied to prevent the kickback and thereby avoid injury to the operator. The time frame in which this anti-kickback action must be accomplished is approximately 10 to 100 milliseconds in order to be effective in those applications involving wood as a workpiece.

Once the kickback condition has been detected and the drive to the power tool implement has been stopped, it is desirable to provide some way in which the operator can restart the power tool once the kickback condition has been eliminated. This could be done by providing a separate reset button for the operator to press which would be quite similar to the reset button of a thermal overload relay. However, the preferred emodiment of the present invention contemplates an easier and more natural way in which the operator can restart the drive to the power tool cutting implement. Specifically as shown in the flow diagram of FIG. 1, the operator restarts the operation by first opening the operator or start switch and then closing the switch again. Thus, if the power tool drive stops due to the detection of a kickback condition, the operator does not have to release his grip on the power tool if it is a portable tool, but needs only to release a trigger switch and then re-operate the trigger switch once the kickback condition has been cleared. On a bench tool, a simple rocker switch need only be quickly operated. In a stationary machine tool system, a remotely operated switch may accomplish the same purpose, or any other manual or automatic system might be used.

Figure 2:
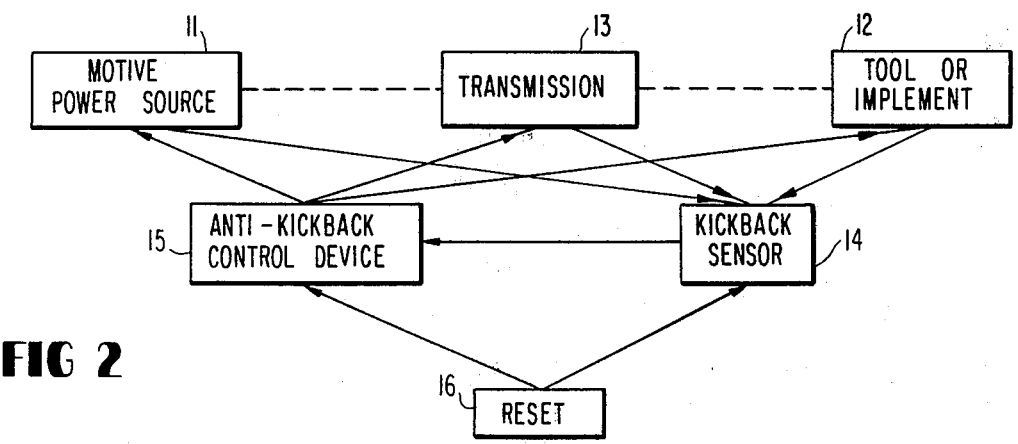
FIG. 2 is a system block diagram illustrating the various alternative combinations of sensing and control which may be used in the practice of the invention.

Now that the general operation of the invention has been described, reference is made to FIG. 2 which illustrates various alternative combinations of sensing and control. Basically, the power tool system may be characterized as comprising a motive power source 11 which is coupled to a tool or other implement 12 by means of a transmission 13. The transmission 13 may be simply a shaft providing direct drive from the motive power source 11 to the tool or implement 12, a gear train providing speed increase or decrease, or any other coupling device. The kickback sensor 14 may derive speed information from any one of the motive power source 11, the implement 12 or the transmission 13 and includes both the speed sensor and the kickback determining means.

In each case, the rate of change of the measured variable is computed and compared with a threshold value to detect an impending kickback condition. When an impending kickback condition is detected, the kickback sensor 14 provides an output to the anti-kickback control device 15. This device is responsive to the output of sensor 14 to remove energy from the tool or implement 12. This can be done by turning off the motive power source 11 or disengaging a clutch in transmission 13. It may also be necessary to apply a brake to the implement 12 or to the transmission 13. Finally, once the kickback condition has been cleared, the power tool or machine tool system is restarted by an output from reset 16 to either or both of the kickback sensor 14 and the anti-kickback control device 15.

As will be appreciated from the foregoing, the invention may be implemented in many ways depending on the type of power tool or machine tool system and the particular choices of the designer. However, to better illustrate the principles of the invention, a specific example of a practical embodiment of the invention using one of the several commercially available microcomputers will now be described.

Figure 4:
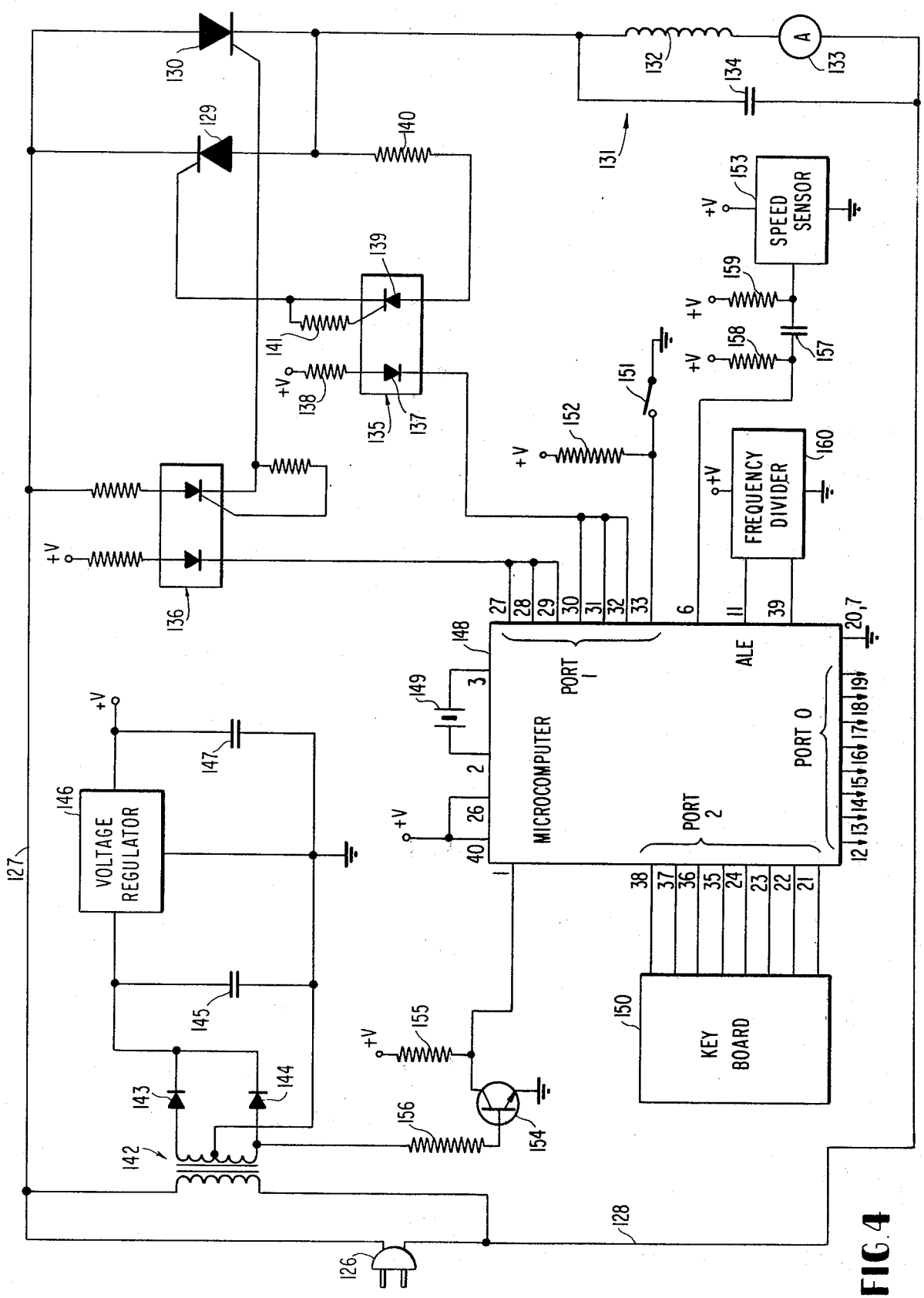
FIG. 4 is a block and schematic diagram of a digital embodiment of the subject invention using the microcomputer shown in FIG. 3.

While the implementation to be described may seem conceptually quite sophisticated, the cost is actually quite inexpensive because the microcomputers are themselves quite inexpensive and perform the functions of many discrete circuits. Such a digital implementation is shown in FIG. 4 which, in prototype form, uses an Intel 8748 microcomputer but, in a production version, would use an Intel 8048 microcomputer or any comparable microcomputer. Both of these microcomputers are part of the Intel MCS-48 microcomputer family, and the principal difference between the 8748 and 8048 microcomputers is that the former has a user programmable and erasable (EPROM) program memory for prototype development whereas the latter has a mask programmable ROM program memory for low cost production. Details of the Intel MCS-48 microcomputer family may be obtained by referencing the *MCS-48* ™ *Microcomputer Users Manual,* published by Intel Corporation,3065 Bowers Avenue, Santa Clara, Calif. 95051, copyright 1976 by Intel Corporation.

The Intel 8748 microcomputer, like other microcomputers of its type, is a complete integrated circuit digital computer implemented on a single semicondutor chip. The Intel 8748 microcomputer is illustrated in block diagram form in FIG. 3. The arithmetic section of the processor is comprised of the arithmetic/logic unit (ALU) 100 and associated registers and control circuitry. These include the accumulator 101, temporary register 102, flags 100a and instruction register and decoder 112. In a typical operation, data stored in accumulator 101 is combined in the ALU 100 with data from another source on the internal bus 106 temporarily stored in register 102, and the result is stored in the accumulator 101 or some other register. The operation code portion of each program instruction stored in program store 114 is transferred under the control of program counter 116 via memory bus 115, internal bus 106 and eight lines represented by numeral 113 to the instruction register and decoder 112 where it is stored and converted to outputs which control the function of the arithmetic section. The ALU 100 accepts 8-bit data words from the accumulator 101 over eight lines represented by numeral 103 and from the register 102 over eight lines represented by numeral 104 and provides an 8-bit data word output to internal bus 106 via eight lines represented by numeral 105. Under the control of the instruction register and decoder 112, the ALU 100 can perform various functions including add with or without carry, AND, OR and Exclusive OR, increment or decrement, bit complement and rotate left or right among others. If the operation performed by the ALU results in a value represented by more than 8 bits, a flag is set in flags 100a. The accumulator 101 is one of the source of input to the ALU 100 and often the destination of the result of operations performed by the ALU via internal bus 106. Data to and from the input/output port buffer registers 123, 124 and 125 and data memory 107 often passes through the accumulator as well.

The program memory 114 consists of 1024 words of 8 bits each which are addressed by the program counter 116 via ten address lines represented by numeral 118. The program counter 116 is itself connected to internal bus 106 by eight lines represented by numeral 117. Program memory 114 in the Intel 8748 microcomputer is an erasable and programmable read-only memory (EPROM), while in the Intel 8048, it is a mask programmable ROM, The data memory 107 is a random access memory (RAM) consisting of 64 words of 8 bits each. The first eight locations (0-7) of the data memory 107 are designated as working registers and are directly addressable by several instructions and are usually used to store frequently accessed intermediate results. The position in data memory 107 where a data word is stored is determined by address registe 108 which is loaded by internal bus 106 and connected by eight lines indicated by numeral 109 to the decode section of data memory 107. Address register 108 also addresses data which is to be read out of data memory 107 via multiplexer 110 and eight lines indicated by numeral 111 to internal bus 106. In this manner, for example, operands can be read out of data memòry 107 and temporarily stored in accumulator 101 or register 102 prior to an operation being performed by ALU 100.

The Intel 8048 microcomputer has 27 lines which can be used for input and/or output functions, and these lines are grouped as three ports of eight lines each and three "test" inputs which can alter program sequences. The three ports are identified as port 0, port 1 and port 2 and are provided with buffer registers 123, 124 and 125, respectively, which are connected to internal bus 106. Ports 1 and 2 have identical characteristics and the lines of these ports are call quasi-bidirectional because of the special output circuit structure which allows each line to serve as an input, an output, or both even though outputs are statically latched. Port 0 is a true bidirectional port with associated input and output strobes. The three "test" inputs to the conditional brach logic 120 and timer/event counter 120a allow inputs to cause program branches under prograon control without the necessity of loading an input port into the accumulator.

The program counter 116 is an independent counter while the program counter stack is implemented using pairs of registers in the data memory 107. The ten bits of the program counter 116 are used to address the 1024 words of the program memory 114. The program counter is initialized to zero by activating the reset line to the control and timing circuits 119. An interrupt to the control and timing circuits 119 or a call to a subroutine in the main program causes the contents of the program counter 116 to be stored in one of the eight register pairs of the program counter stack in data memory 107. The pair to be used is determined by a three bit stack pointer. The stack pointer when initialized to 000 points to locations 8 and 9 in data memory 107. The first subroutine jump or interrupt results in the program counter contents being transferred to locations 8 and 9, and the stack pointer is then incremented by one to point to locations 10 and 11 in anticipation of another subroutine call. Nesting of subroutines without subroutines can continue up to eight times without overflowing the stack. The end of the subroutine causes the stack pointer to be decremented and the contents of the resulting register pair to be transferred to the program counter 116.

An interrupt sequence is initiated by applying a low "0" level to the interrupt input of the control and timing circuits 119. The interrupt line is sampled every machine cycle and, when detected, causes a "jump to subroutine" at location 3 in the program memory as soon as all cycles of the current instruction are complete. As in any call to subroutine, the program counter contents are saved in the stack. Program memory location 3 contains an unconditional jump to an interrupt service subroutine elsewhere in the program memory.

The timer/event counter 120a is used to count external events and generate accurate time delays. The counter is an eight bit binary counter which is presettable and readable with two instructions which transfer the contents of the accumulator 101 to the counter 120a via bus 106 and vise versa. Once started, the counter 120a will increment to its maximum count and overflow until stopped by a stop timer counter instruction or reset. An overflow results in setting an overflow flag and in the generation of an interrupt request. The timer interrupt may be enabled or disabled independently of the external interrupt by appropriate instructions. If enabled, the counter overflow will cause a subroutine call to location 7 where the timer or counter service routine may be stored. If timer and external interrupts occur simultaneously, the external source will be recongnized.

Timing generation is self-contained with the exception of a frequency reference which can be a crystal, series RC circuit or external clock source applied to the XTAL inputs of the control and timing circuits 119. Basically, these circuits can be divided into the following functional blocks: on-board oscillator, state counter and cycle counter. The output of the oscillator is divided by three in the state counter to create a clock. The clock is then divided by five in the cycle counter to define a machine cycle consisting of five machine states.

The conditional branch logic 120 which communicates with the control and timing circuits 119 via lines 121 and the instruction register and decoder 112 via lines 122 enables several conditions internal and external to the processor to be tested by the users program.

Figure 3:
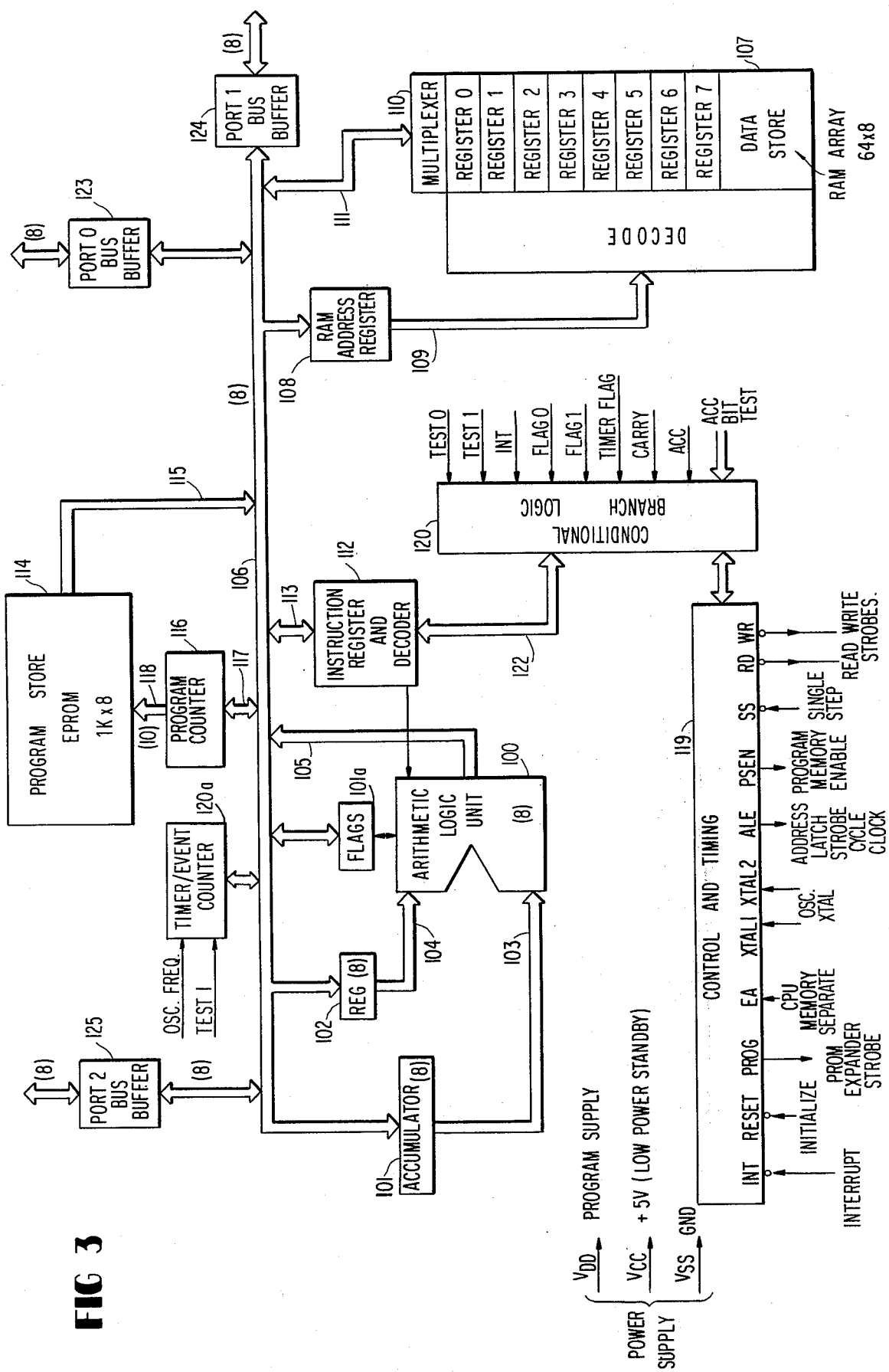
FIG. 3 is a generalized block diagram of a microcomputer used in a digital implementation of the invention.

The operation of the microcomputer shown in FIG. 3 is conventional. The activies of the microcomputer are controlled by an internal clock and typically involve the fetching of an instruction, performance of the operation required, fetching the next instruction and so forth as specified in the program stored in program memory 114. Program counter 116 contains the address of the next program instruction, and the program counter is updated by incrementing the counter each time it fetches an instruction. The instructions are stored in program memory 114 in a sequential order, except where the program branches. In this event, a jump instruction containing the address of the instruction which is to follow it is stored in program memory 114. This address is also loaded into program counter 116 which is again incremented after the branch has been executed. When a subroutine is called by the main program, the contents of program counter 116 are stored in two one of the sixteen registers numbered 8 through 24 in data memory 107 which, as described before, are called the program stack. The subroutine is simply a program within a program and is typically used when a set of instructions must be executed repeatedly in the course of a main program. By storing the contents of program counter 116 in two of the registers of data memory 107, the computer can return to the main program at the end of the subroutine by replacing the contents of program counter 116 with the contents previously stored in two of the registers of data memory 107.

Referring now to FIG. 4, a power plug 126 is adapted to be plugged into an AC outlet and is provided with power lines 127 and 128. Power line 127 is connected to the cathode of SCR 129 and to the anode of SCR 130. The anode of SCR 129 is connected in common with the cathode of SCR 130 to motr 131. Motor 131 is a universal electric motor comprising a field 132 connected in series with an armature 133 and having a switching noise suppression capacitor 134 connected in parallel with the series connection of field 132 and armature 133. The common junction of armature 133 and capacitor 134 are connected to power line 128.

A gate control circuit 135 supplies gating pulses to SCR 129, while a gate control circuit 136 supplies gating pulses to the gate of SCR 130. Gate control circuits 135 and 136 are identical, and, therefore, only the details of gate control circuit 135 will be described. This circuit comprises an opto-coupler. The opto-coupler package includes a light emitting diode (LED) 137 having its anode connected through resistor 138 to a source of positive voltage +V. In the same package with LED 137 is a photo gated SCR 139 having its anode connected through resistor 140 to the anode of SCR 129 and its cathode connected directly to the gate electrode of SCR 129. The gate and cathode of SCR 139 are connected together by resistor 141 to provide a bias level to the gate of that SCR. In operation, when LED 137 is biased to conduction, SCR 139 conducts to provide a gating signal to SCR 129 causing that SCR to conduct supplying current to motor 131. In a similar manner, SCR 130 is caused to conduct to supply current to motor 131 in alternate half cycles of the AC power by gate control circuit 136.

The DC power supply which develops the supply voltage for the various circuits used in the FIG. 4 embodiment comprises a transformer 142 having its primary connected across power lines 127 and 128. The center tapped secondary winding of transformer 142 is connected to a full-wave rectifier comprising diodes 143 and 144, the center tap being connected to system common. A filter capacitor 145 is connected from the output of the full-wave recitifier to chassis ground. A series voltage regulator 146 is connected between the output of the full-wave recitifier and the regulated output of the power supply indicated as +V. Voltage regulator 146 may be, for example, a type MC78M05C regulator manufactured by Motorola Semiconductor Products, Inc. A further filter capacitor 147 is connected across the output of regulator 146 and chassis ground.

The heart of the system shown in FIG. 4 is microcomputer 148 which is illustrated in FIG. 3. This computer is fabricated as an integrated circuit having a total of 40 pin connectors. Pins 27–34 comprise the 8-bit port 1, while pins 21–24 and 35–38 comprise the 8-bit port 2. Pins 12–19 comprise the 8-bit bus port 0 which is not used in this embodiment. Pins 2 and 3 are connected to an external crystal 149 which supplies a 6 MHz timing reference. The regulated +V from the power supply is connected to pins 40 and 26, while pins 20 and 7 are connected to system common. In the embodiment shown in FIG. 4, a keyboard 150 is connected to the eight pins which comprise port 2. The purpose of this keyboard is to provide the operator with the ability to select desired speeds of operation. This is an advantageous feature when the power tool is to be used to cut various types of workpiece materials and avoids the necessity of mechanical speed changing devices. This could also be a rotary, slide, keyboard or other type switch. Pins 27, 28 and 29 of port 1 are connected in common to the cathode of the LED in switch control circuit 136, and pins 30, 31 and 32 of port 1 are connected in common to the cathode of LED 137. This is done merely to supply sufficient drive current to the opto-couplers. An operator or start switch 151 is connected between chassis ground pin 33 of port 1, and a pull-up resistor 152 connects the same pin 33 to the regulated +V output of the DC power supply. Thus, when switch 151 is closed, ground potential is provided to pin 33 of port 1, and when switch 151 is opened, the +V regulated supply voltage is supplied to pin 33. Alternatively, a switch can be put in the reset line or power can be removed from the microcomputer allowing the automatic power on reset circuit contained in the microcomputer to be used.

A Hall effect speed sensor 153 is connected to the interrupt input at pin 6 of microcomputer 148. The Hall effect speed sensor is a commerically available item manufactured by Sprague with the designation UGN 3013. The Hall effect speed sensor 153 produces an output when a magnet (not shown) secured to the outer edge of the motor fan blade or some other rotating part of the power tool passes in close proximity to the Hall effect sensor. The output of the Hall effect speed sensor 153 is converted to a pulse of predetermined width by the differentiator comprising capacitor 157 and resistors 158 and 159 and supplied to interrupt terminal 6 of microcomputer 148. When a pulse is applied to the interrupt terminal, the internal timer is stopped, recorded and restarted to provide an elapsed time measurement which is a measure of the armature shaft speed.

Zero crossing information is generated by a transistor 154 having its emitter connected to chassis ground and its collector connected to pin 1 of microcomputer 148 and through load resistor 155 to the regulated +V output of the DC power supply. The base of transistor 154 is connected via resistor 156 to one end of the secondary winding of transformer 142.

Because the 8748 microcomputer has an internal clock frequency of 400 kHz, and a timer period of 10 microseconds was desired, it was necessary to externally provide to two-stage frequency divider 160. The two-stage frequency divider is a dual flip-flop integrated circuit and may be, for example, a CA4027A circuit manufactured by RCA. The 400 kHz clock is available at the address latch enable (ALE) output at pin 11 of the microcomputer which is connected to the input of the two-stage frequency divider 160. Frequency divider 160 divides the 400 kHz clock by four so that a 100 kHz clock signal is provided at the timer/counter input at pin 39 of the microcomputer.

The flow diagrams for the microcomputer program are shown in FIGS. 5A, 5B and 5C. The main program for kickback control is shown in FIG. 5A. After the power cord of the power tool has been plugged in to an AC outlet, the first step of the flow diagram is to initialize all registers and input/output buffers. The next step in the flow diagram is to check the status of the operator or start switch 151, and if it is on or closed, then the program proceeds to the next step. Otherwise, the program returns to the first step. If the switch 151 is closed, the next step is to fire an appropriate one of SCRs 129 or 130 through the corresponding one of gate control circuits 135 or 136, respectively. Upon the firing of one of the SCRs 129 or 130, the implement driven by the power tool is in motion so that the next step in the flow dagram is to check to see whether an impending kickback condition has been detected. If not, the program returns to the second step. However, once an impending kickback condition has been detected, the program blocks all further firing commands to the SCRs 129 and 130, thereby stopping the power tool.

Kickback is computed by the external interrupt routine shown in FIG. 5B. Basically, what this routine does is to measure the speed of the armature 133 by measuring the time between interrupt pulses produced by the speed sensor 153 and compute the difference between subsequent speed readings. More particularly, the new speed reading (NSR) is the newest value of the time between interrupt pulses produced by speed sensor 153. Therefore, when an interrupt pulse is applied to terminal 6 of microcomputer 148, the timer is stopped and the elapsed time counted by the timer since the last interrupt is read into a register as the new speed reading. The old speed reading (OSR) is the last time reading between external interrupts, and this is compared with the new speed reading to determine if armature 133 is decelerating. A deceleration is detected when the old speed reading (elapsed time) is less than the new speed reading (elapsed time), i.e., OSR<NSR. If a deceleration is detected, a value for kickback is computed by taking the difference between the new speed reading and the old speed reading. If no deceleration is detected, the step of computing kickback is skipped. In either case, the next step in the routine is to update the old speed reading by transferring the contents of the new speed reading register to the old speed reading register. In the processs the new speed reading register is cleared and the timer restarted to be ready for the next interrupt. The external interrupt routine then returns to the main program.

The timer interrupt routine shown in FIG. 5C is necessitated by the fact that the internal timer of the 8748 microcomputer has only an 8-bit resolution and a 16-bit resolution is required. Therefore, a 16-bit timer is implemented with a combination of hardware and software. This is done by dividing the 16-bit timer into two 8-bit bytes and designating the least significant byte as the low new speed reading (LNSR) and the most significant byte as the high new speed reading (HNSR). The LNSR byte is accumulated in the internal timer, and whenever an overflow occurs, the timer interrupt routine is started. The overflow is used to increment the HNSR byte by one. Ordinarily, this is all that is done in this routine, but under some conditions of extremely slow rotation of armature 133, there is the posibility that the HNSR byte might "overflow". If this were to happen, some extremely erratic speed readings would result. To prevent this from happening, the HNSR byte is checked each time it is incremented to determine if it has reached a full count of 255. If the full count condition is reached, the timer is stopped and the old speed reading is set equal to the full count condition. At this time or if the full count condition was not detected, the timer interrupt routine returns to the main program.

Attached hereto as an appendix is a computer printout of the assembly language program depicted in FIGS. 5A, 5B and 5C for the 8748 microcomputer used in the circuit shown in FIG. 4. The order of the printout, however, is just the opposite of that of FIGS. 5A, 5B and 5C.

The description of the digital implementation is given to illustrate a specific preferred embodiment and should not be construed as a limitation to the practice of the invention. Those skilled in the art will recognize that other commercially available microcomputers could be used based on the teachings set forth hereinabove. Among those microcomputers which are considered to be especially suited to the commercial practice of the invention are the 3870 microcomputer manufactured by Mostek Corporation, Fairchild Camera and Instrument Corp. and Motorola Semiconductor Products, Inc., and the 8085A microcomputer manufactured by Intel Corportion. However, there are many other equivalent microcomputers now on the market and others can be expected to be commercially introduced in the future.

Moreover, those skilled in the art will appreciate that there are many known ways to measure speed, and some of these are illustrated in FIGS. 6 through 11. FIG. 6 shows the technique used in the embodiment shown in FIG. 4. A magnet 21 is mounted on the periphery of a rotor 22 turned by a shaft 23. In the case of a portable power tool driven by a universal motor, for example, the rotor 22 could be a fan blade secured directly to the armature shaft 23. But as will be recalled with reference to FIG. 2, the speed measurement does not have to be made at the motive power source 11. The rotor 22 could just as well be a disc turned by the transmission 13, and in some of the speed measuring devices to be described, it is even possible to measure the speed of the tool implement 12 itself.

Returning now to FIG. 6, the speed measuring device used in the FIG. 4 embodiment employed a Hall effect sensor 24 located proximate to the outer periphery of the rotor 22 to detect the passing of magnet 21 each revolution of the rotor. Instead of a Hall effect sensor, a magneto-diode can serve the same function. And as shown in FIG. 7, a simple coil 25 can also be used.

A variation on the magnetic speed sensor is shown in FIG. 8 which illustrates what is known as a variable reluctance system. In this system, one or more magnetic prices 26 are mounted in regularly spaced intervals about the periphery of a rotor 27 which itself is made of a magnetic material. The rotor 27 is turned by a shaft 28, and when an adjacent pair of magnetic pieces 26 are in registry with the magnet 29 and detector 30, an output signal is generated. The detector 30 could be a Hall effect sensor a magneto-diode or a coil.

It is also possible to mechanically generate a speed signal with a commutator as shown in FIG. 9. In this figure, the commutator 31 is shown from the side and includes a pair of brushes 32 and 33 to provide a commutated output signal.

Speed may also be measured optically. FIG. 10 shows a reflective system wherein a plurality of reflective strips 34 are painted on or otherwise adherred to rotor 35 turned by shaft 36. A light emitting diode (LED) and photo-transistor or diode are contained in a common package 37 and have their respective optical paths oriented to intersect at the surface of rotor 35. Thus, an output will be generated by the phototransistor or diode each time a reflective strip passes the common package 37. FIGS. 11A and 11B show, respectively, a side view and a plan view of a transmissive system wherein the rotor 38 is provided with a plurality of aperatures 39 spaced at regular intervals adjacent its peripheral edge. The rotor 38 is turned by shaft 40 so that it passes between the legs of sensor 41. The sensor 41 is of known type having an LED in one leg directed to emit light to pass through the aperatures 39 and impinge on a phototransistor or diode in the other leg. The optical speed sensors are perhaps best adapted for use at any location in the power tool system shown in FIG. 2 including the tool implement 12. For example, the cutting implement itself could be the rotor 35 or the rotor 38.

The various speed sensors shown in FIGS. 6 through 11 are designed for use with a rotary shaft, but the principles of each can be applied to a reciprocating shaft for those tools where the cutting implement reciprocates rather than rotates. Moreover, it is possible to use an analog speed sensor, such as a tachometer, and an analog-to-digital converter to provide a digital speed input to the microcomputer.

The invention may also be practiced using analog techniques. In FIG. 12, a power plug 200 adapted to be plugged into a conventional AC outlet is provided with two power lines 201 and 202. These two power lines supply a switch control and driver circuit 203 of conventional design and also the series connection of solid-state switching circuit 204 and universal motor 205. The universal motor is illustrated as comprising a field 206, an armature 207 connected in series with the field and a suppression capacitor 208 connected in parallel with the series connection of field 206 and armature 207. The solid-state switching circuit 204 can be made up of a pair of SCR's or a triac which are fired by switch control and driver circuit 203 to supply current to motor 205. The switch control and driver circuit typically includes a zero crossing detector circuit and, in a variable speed tool, a speed selector such as a potentiometer or the like. The switch control and driver circuit then generates firing pulses to the solid-state switching circuit in a manner well known in the art.

The circuitry thus far described in FIG. 12 is conventional and typical of any number of variable speed power hand tools. As has already been explained the first operation in the method of operation of the subject invention is to monitor the speed. This is done with a speed sensor 209 which may be a tachometer or any of speed measuring devices illustrated in FIGS. 6 through 11. Those skilled in the art will appreciate that instead of a tachometer, the back e.m.f. of the motor can also be measured to develop a signal proportional to speed. Depending on the type of sensor chosen, a signal conditioning circuit 210 may be required. For example, if a tachometer is used as a speed sensor, amplifier and limiting circuits may be required. On the other hand should one of the pulse generating sensors shown in FIGS. 6 through 11 be chosen, then the signal conditioning circuit 210 would take the form of a frequency-to-voltage converter. In any case, the output of the signal conditioning circuit 210, if one is used, or the sensor 209, if one is not used, is a voltage proportional to motor speed or current. This voltage is differentiated and compared with a reference in differentiator and comparator 211. By differentiating the input voltage, a rate of change signal is developed which is then compared with the reference supplied by the DC power supply 215. If the rate of change signal exceeds the threshold established by the reference, the differentiator and comparator 211 generates an output pulse. This output pulse is supplied to the set input of latch 217 which may be a conventional flip-flop having both set and reset inputs. When latch 217 is set by the output pulse, an inhibit signal is supplied to switch control circuit 203 to cause the switch control circuit to stop supplying firing pulses to solid-state switching circuit 204. In this way, the flow of current to motor 205 is interrupted. The latch 217 is reset by closing switch 220.

FIGS. 13 to 16 are modifications which illustrate the universal applicability of the invention to all classes of power tools. In these figures, the same reference numerals as used in FIGS. 4 or 12 designate identical or corresponding parts, and a detailed decription of the circuitry which is common to these several modifications is omitted.

Figure 13:
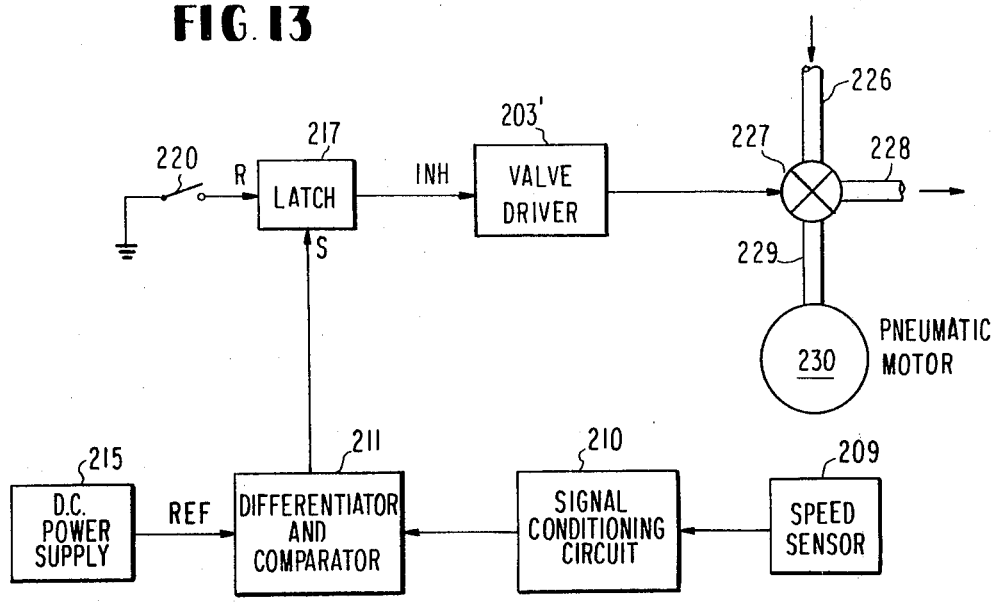
FIG. 13 is a block and schematic diagram of the analog embodiment wherein the motive power source is a pneumatic motor.

Referring first to FIG. 13, the invention may be adapted for use with a pneumatic motor driven powe tool, such as a pneumatic drill or the like. This embodiment employs the analog techniques described with reference to FIG. 12. A hose or other conduit 226 supplies air to a solenoid operated valve 227. When latch 217 is set, the valve driver 203' de-energizes the valve solenoid so that valve 227 conducts the air supplied by hose 226 to an exhaust port which may be connected to another hose 228. On the other hand, when latch 217 is reset by closing switch 220, the valve driver 203' energizes the valve solenoid so that valve 227 conducts the air supplied by hose 226 to hose 229 which supplies pneumatic motor 230. Speed sensor 209 produces a speed signal that is differentiated and compared with the reference supplied by DC power supply 215. Typically, in a pneumatic power tool, there is no AC power, and so DC power supply 215 may simply be a battery or, more desirably, an inverter with a regulated output.

Figure 14:
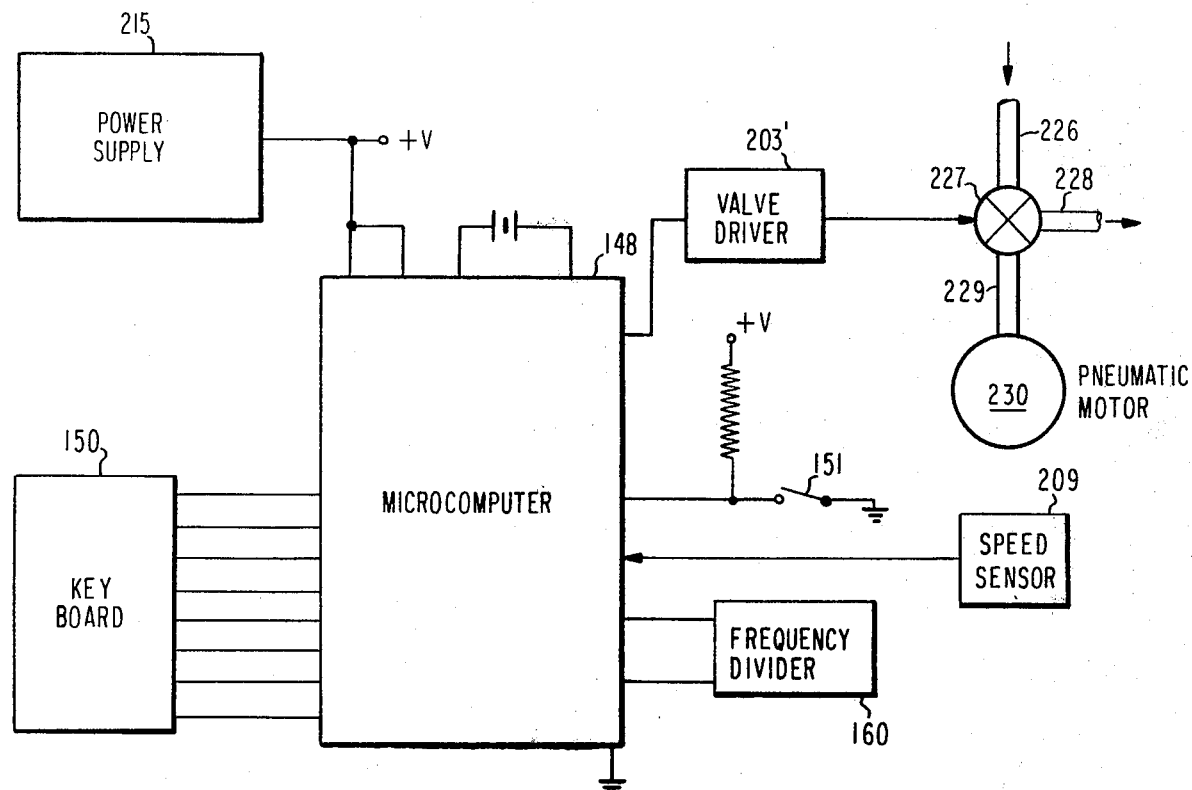
FIG. 14 is a block and schematic diagram of the digital embodiment wherein the motive power source is a pneumatic motor.

FIG. 14 is similar to FIG. 13 wherein the invention is adapted for use with a pneumatic motor driven power tool but differs therefrom in that the embodiment shown in FIG. 14 uses the digital techniques described with reference to FIGS. 3, 4 and 5.

Figure 15:
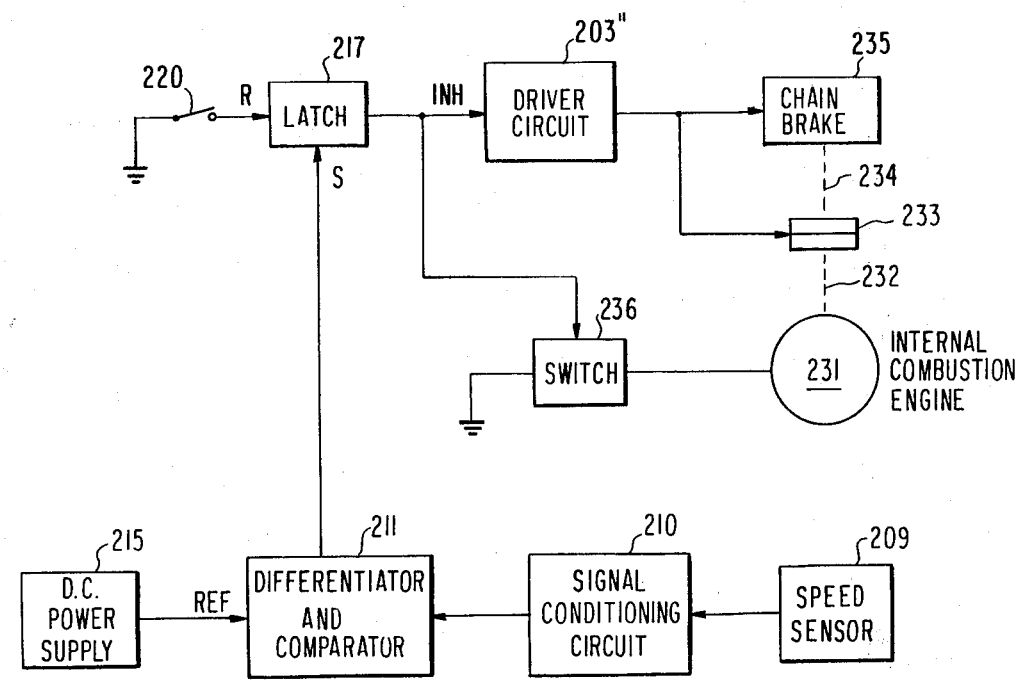
FIG. 15 is a block and schematic diagram of the analog embodiment wherein the motive power source is an internal combustion engine.

Referring now to FIG. 15, the invention is adapted for use with an interal combustion engine driven power tool and, in the specific example illustrated, a chain saw. Engine 231 is connected by shaft 232 through a solenoid operated clutch 233, a second shaft 234 and a solenoid operated chain brake to a chain brake to a chain driving sprocket (not shown). When latch 217 is set, both clutch 233 and chain brake 235 are actuated to disconnect power to and stop the movement of the chain driving sprocket. In some cases, it may be desirable to ground the engine magneto to stop the engine, and this may be accomplished by switch 236. It will, of course, be appreciated that the use of a clutch and/or a brake are not limited to power tools having an interanal combustion engine as a motive power source. Clutches and/or brakes can also be used with electric motors and pneumatic motors separately or, more appropriately, in addition to the devices already discussed. In fact, in large stationary industrial tools where inertial forces can be extremely high, the addition of a brake in particular may be very desirable. Moreover, the type of brake is of no special consequence to the invention, and in an electric motor driven power tool, an electromagnetic brake of known type would be especially advantageous.

Figure 16:
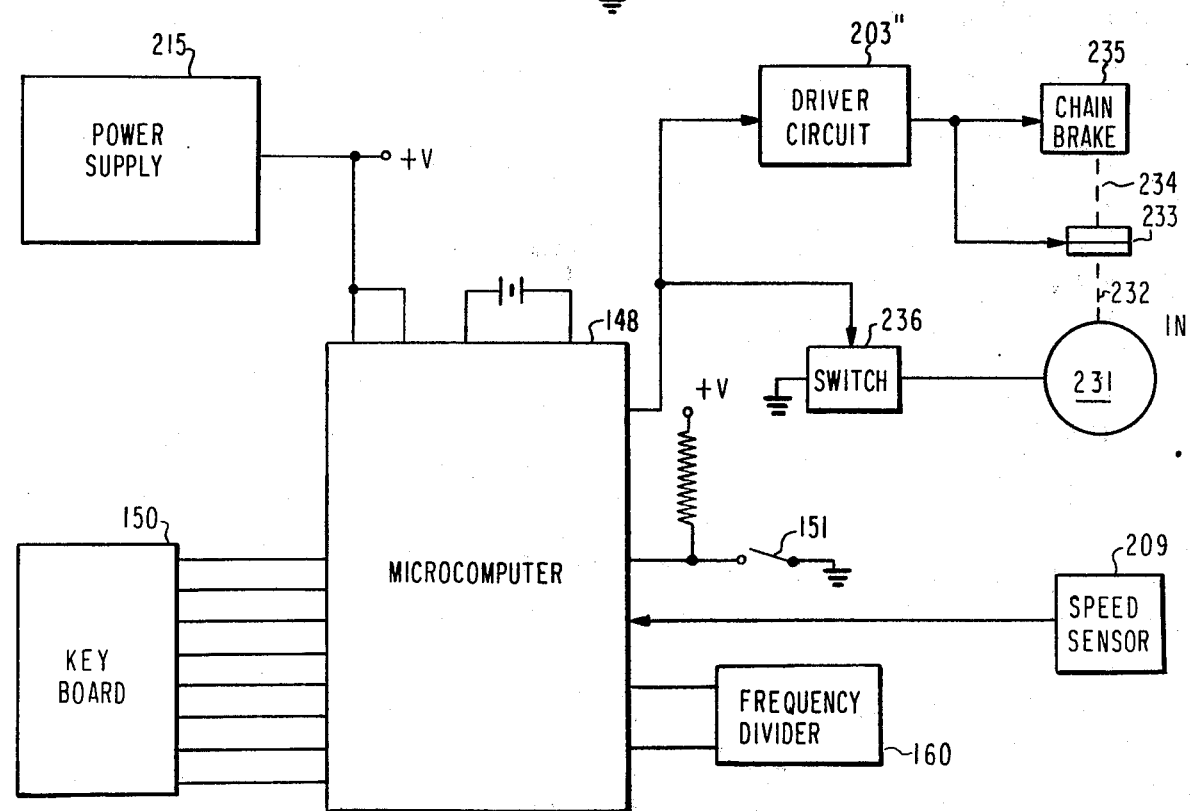
FIG. 16 is a block and schematic diagram of the digital embodiment wherein the motive power source is an internal combustion engine.

FIG. 16 is similar to FIG. 15 wherein the invention is adapted for use with an internal combustion engine driven power tool but differs therefrom in that the embodiment shown in FIG. 15 uses the digital techniques described with reference to FIGS. 3, 4 and 5.

APPENDIX

```
ASM48 KICK.SRC MACROFILE PAGEWIDTH(72) PAGING
ISIS-II MCS-48/UPI-41 MACRO ASSEMBLER, V2.0
    LOC  OBJ        SEQ         SOURCE STATEMENT

1   ;***************************************************
                         ****************************
                     2                                    ;
                     3                                    ;TOOL CONTROL PROGR
                         AM - KICKBACK CONTROL
                     4                                    ;
                     5                                    ;REGISTER ASSIGNMEN
                         TS--
                     6                                    ; WORKING   - R0, 1
                         , 2, 7
                     7                                    ; RB1 R'S 0,1,5,6,
                         7 - WORKING
                     8   ;              R1AH             ; RB1 R2 - TINT F
                         LAG FOR NESTED INTERRUPTS
                     9   ;              R1BH             ; RB1 R3 - HI NSR
                         COUNTER
                    10   ;              R2CH             ; KICKBACK LIMIT -
                         R44
                    11   ;              R2EH&2FH         ; NSR' - R46(H.O.)
                         , R47(L.O.)
                    12                                    ;
                    13   ;***************************************************
                         ****************************
                    14                                    ;
    0000 044A       15            JMP    START
    0002 BB         16            DB     0BBH            ; DUMMY SLOT
    0003 0423       17            JMP    EXTINT
                    18
    0005 93         19   JUNK:    RETR
    0006 00         20            NOP                    ;
                    21
```

| LOC | OBJ | SEQ | SOURCE STATEMENT | |
|---|---|---|---|---|
| | | 22 | | |
| | | 23 | | |
| | | 24 | | |
| | | 25 | | ; |
| 0007 | 1405 | 26 | TINT: CALL JUNK | ;ALLOW EXTERNAL INTERRUPT |
| 0009 | D5 | 27 | SEL RB1 | ; |
| 000A | AD | 28 | MOV R5,A | ;SAVE ACCUMULATOR IN RB1,R5 |
| 000B | 1A | 29 | INC R2 | ;SET TINT FLAG |
| 000C | 15 | 30 | DIS I | ;DISABLE EXTERNAL INT. TEMPORARILY |
| 000D | 1612 | 31 | JTF UPNSR | ;IF TIMER OFLOWED DURING EXTINT |
| 000F | 05 | 32 | EN I | ;RE-ENABLE EXTERNAL INTERRUPT |
| 0010 | 0420 | 33 | JMP AROUND | ; SKIP NSR HIGH INCR. |
| 0012 | 1B | 34 | UPNSR: INC R3 | ; |
| 0013 | 05 | 35 | EN I | ;RE-ENABLE EXTERNAL INTERRUPT |
| 0014 | FB | 36 | MOV A,R3 | ; |
| 0015 | 37 | 37 | CPL A | ; |
| 0016 | 9620 | 38 | JNZ AROUND | ; |
| 0018 | 65 | 39 | STOP TCNT | ; |
| 0019 | B828 | 40 | MOV R0,#40 | ;HI OSR |
| 001B | B0FF | 41 | MOV @R0,#0FFH | ; |
| 001D | 18 | 42 | INC R0 | ; |
| 001E | B000 | 43 | MOV @R0,#00 | ; |
| 0020 | FD | 44 | AROUND: MOV A,R5 | ;REPLACE ACCUMULATOR VALUE |
| 0021 | CA | 45 | DEC R2 | ; |
| 0022 | 93 | 46 | RETURN: RETR | ;END TIMER INTERRUPT |
| | | 47 | | ; |
| | | 48 | | ; |
| | | 49 | | |
| | | 50 | | |
| | | 51 | | |
| | | 52 | | |
| 0023 | D5 | 53 | EXTINT: SEL RB1 | ;AVOID AFFECTING INDIRECT ADDRESSES |
| 0024 | AF | 54 | MOV R7,A | ;SAVE ACC. |
| 0025 | 65 | 55 | STOP TCNT | ; |
| 0026 | B927 | 56 | MOV R1,#39 | ; |
| 0028 | 42 | 57 | MOV A,T | ; |
| 0029 | A1 | 58 | MOV @R1,A | ; |
| 002A | 27 | 59 | CLR A | ; |
| 002B | 62 | 60 | MOV T,A | ;CLEAR TIMER |
| 002C | 45 | 61 | STRT CNT | ;RESTART TIMER |
| 002D | 1631 | 62 | JTF INCNSR | ;IF TIMER OFLOWED AFTER EXTINT STARTED |
| 002F | 0439 | 63 | JMP HINSR | ;TIMER DID NOT OVERFLOW, SKIP INCNSR |
| 0031 | FB | 64 | INCNSR: MOV A,R3 | ; |
| 0032 | 97 | 65 | CLR C | ; |
| 0033 | 17 | 66 | INC A | ; |
| 0034 | AB | 67 | MOV R3,A | ; |
| 0035 | E639 | 68 | JNC HINSR | ; |
| 0037 | 07 | 69 | DEC A | ; |
| 0038 | AB | 70 | MOV R3,A | ; |
| 0039 | C9 | 71 | HINSR: DEC R1 | ; |
| 003A | FB | 72 | MOV A,R3 | ; |
| 003B | A1 | 73 | MOV @R1,A | ; |
| 003C | BB00 | 74 | MOV R3,#00 | ; |
| 003E | FF | 75 | MOV A,R7 | ;REPLACE ACCUMULATOR VALUE |
| | | 76 | | ;IF TRIAC FIRED,RETURN |
| 003F | 2A | 77 | XCH A,R2 | ;TINT FLAG TO ACC |
| 0040 | C646 | 78 | JZ REPLTF | ;TINT NOT IN PROGRESS |
| 0042 | FF | 79 | MOV A,R7 | ;FT COUNTDOWN,PASSED FORM TINT |
| 0043 | AD | 80 | TIFLAG: MOV R5,A | ; |

| LOC | OBJ | SEQ | | SOURCE | STATEMENT | |
|---|---|---|---|---|---|---|
| 0044 | 2301 | 81 | | MOV | A,#01 | ;RESET TINT FLAG |
| 0046 | 2A | 82 | REPLTF: | XCH | A,R2 | ;REPLACE ACCUMULATOR AND TINT FLAG |
| 0047 | BE01 | 83 | RETUR: | MOV | R6,#01 | |
| 0049 | 93 | 84 | | RETR | | |
| | | 85 | | | | ; |
| 004A | 99C0 | 86 | START: | ANL | P1,#0C0H | ;TURN ON SCR |
| 004C | 15 | 87 | RESET: | DIS | I | |
| 004D | 35 | 88 | | DIS | TCNTI | |
| 004E | 65 | 89 | | STOP | TCNT | ;FOR USE IF SWITCH TURNED OFF |
| 004F | B822 | 90 | | MOV | R0,#34 | ; |
| 0051 | B90F | 91 | | MOV | R1,#15 | ; |
| 0053 | 27 | 92 | | CLR | A | ; |
| 0054 | 18 | 93 | CLRR: | INC | R0 | ; |
| 0055 | A0 | 94 | | MOV | @R0,A | ;CLEAR RAM |
| 0056 | E954 | 95 | | DJNZ | R1,CLRR | |
| 0058 | B817 | 96 | | MOV | R0,#23 | ; |
| 005A | B908 | 97 | | MOV | R1,#08 | ; |
| 005C | 18 | 98 | CLRRB1: | INC | R0 | ; |
| 005D | A0 | 99 | | MOV | @R0,A | ;CLEAR RB1 |
| 005E | E95C | 100 | | DJNZ | R1,CLRRB1 | |
| 0060 | A5 | 101 | | CLR | F1 | ; |
| 0061 | AE | 102 | | MOV | R6,A | ;CLEAR FLAG REGISTER |
| 0062 | AD | 103 | | MOV | R5,A | ; |
| 0063 | 62 | 104 | | MOV | T,A | ;CLEAR TIMER |
| 0064 | 3A | 105 | | OUTL | P2,A | ; |
| | | 106 | | | | ; |
| | | 107 | | | | ; |
| | | 108 | | | | ;PRELOAD OSR AND HIGH NSR |
| 0065 | B825 | 109 | | MOV | R0,#37 | |
| 0067 | B064 | 110 | | MOV | @R0,#100 | |
| 0069 | 18 | 111 | | INC | R0 | |
| 006A | B0FF | 112 | | MOV | @R0,#0FFH | |
| 006C | 18 | 113 | | INC | R0 | |
| 006D | 18 | 114 | | INC | R0 | |
| 006E | B0FF | 115 | | MOV | @R0,#0FFH | ; |
| 0070 | 18 | 116 | | INC | R0 | |
| 0071 | B81B | 117 | | MOV | R0,#1BH | ; |
| 0073 | B0FF | 118 | | MOV | @R0,#0FFH | ; |
| | | 119 | | | | ; |
| 0075 | 8940 | 120 | IFSWIT: | ORL | P1,#40H | ;CHECK FOR TRIGGER SWITCH ON |
| 0077 | 09 | 121 | | IN | A,P1 | ; |
| 0078 | D24A | 122 | | JB6 | START | |
| 007A | 05 | 123 | | EN | I | |
| 007B | B926 | 124 | SHKICK: | MOV | R1,#38 | |
| 007D | B82E | 125 | | MOV | R0,#46 | |
| 007F | F1 | 126 | TRYAGN: | MOV | A,@R1 | ;HIGH NSR |
| 0080 | A0 | 127 | | MOV | @R0,A | ;SAVE HIGH NSR AS HIGH NSR' |
| 0081 | 19 | 128 | | INC | R1 | |
| 0082 | 18 | 129 | | INC | R0 | |
| 0083 | F1 | 130 | | MOV | A,@R1 | ;LOW NSR |
| 0084 | A0 | 131 | | MOV | @R0,A | ;LOW NSR TO LOW NSR' |
| 0085 | C9 | 132 | | DEC | R1 | |
| 0086 | C8 | 133 | | DEC | R0 | |
| 0087 | F1 | 134 | | MOV | A,@R1 | |
| 0088 | D0 | 135 | | XRL | A,@R0 | ;IS HIGH NSR = HIGH NSR'? |
| 0089 | 967F | 136 | | JNZ | TRYAGN | ;IF NOT INT HAS OCCURRED -- TRY AGAIN |
| 008B | B929 | 137 | | MOV | R1,#41 | ;POINT TO LOW OSR |
| 008D | B82F | 138 | | MOV | R0,#47 | ;POINT TO LOW NSR' |
| 008F | 97 | 139 | | CLR | C | ; |
| 0090 | F0 | 140 | | MOV | A,@R0 | ;LOW NSR TO ACC. |
| 0091 | 37 | 141 | | CPL | A | |
| 0092 | 61 | 142 | | ADD | A,@R1 | ;SUBT. LO OSR |
| 0093 | 37 | 143 | | CPL | A | ; |
| 0094 | AA | 144 | | MOV | R2,A | ;LOW KICKBACK |
| 0095 | C8 | 145 | | DEC | R0 | ; |

| LOC | OBJ | SEQ | | SOURCE STATEMENT | | |
|---|---|---|---|---|---|---|
| 0096 | C9 | 146 | | DEC | R1 | ; |
| 0097 | F0 | 147 | | MOV | A,@R0 | ;HI NSR TO ACC. |
| 0098 | 37 | 148 | | CPL | A | ; |
| 0099 | 71 | 149 | | ADDC | A,@R1 | ;SUBT. HI OSR |
| 009A | 37 | 150 | | CPL | A | ; |
| 009B | F6C2 | 151 | | JC | NOKICK | ;SPEED INCREASING - NO KICKBACK |
| 009D | A9 | 152 | | MOV | R1,A | ;HI KICKBACK |
| | | 153 | | | | ;TEST FOR KICKBACK DISABLE |
| 009E | B825 | 154 | | MOV | R0,#37 | ; |
| 00A0 | F0 | 155 | | MOV | A,@R0 | ; |
| 00A1 | C6B1 | 156 | | JZ | KIKCHK | ;KICKBACK NOT DISABLED |
| 00A3 | B81E | 157 | | MOV | R0,#30 | |
| 00A5 | F0 | 158 | | MOV | A,@R0 | |
| 00A6 | C6C2 | 159 | | JZ | NOKICK | |
| 00A8 | B000 | 160 | | MOV | @R0,#00 | |
| 00AA | B825 | 161 | | MOV | R0,#37 | |
| 00AC | F0 | 162 | | MOV | A,@R0 | |
| 00AD | 07 | 163 | | DEC | A | ;IF KICKBK DISABLED, DECREMENT |
| 00AE | A0 | 164 | | MOV | @R0,A | ;COUNTDOWN FOR RE-ENABLING |
| 00AF | 04C2 | 165 | | JMP | NOKICK | ;SKIP KICKBACK CHECK |
| | | 166 | | | | ; |
| 00B1 | F9 | 167 | KIKCHK: | MOV | A,R1 | ;HI KICKBACK TO ACC. |
| 00B2 | 96BB | 168 | | JNZ | KICKBK | ;NSR - OSR VERY HIGH |
| 00B4 | FA | 169 | | MOV | A,R2 | ;LOW KICKBACK TO ACC. |
| 00B5 | 97 | 170 | | CLR | C | ; |
| 00B6 | 37 | 171 | | CPL | A | ; |
| 00B7 | 0306 | 172 | | ADD | A,#06 | ;SUBTRACT LIMIT -6= LIMIT |
| 00B9 | F6C2 | 173 | | JC | NOKICK | ;KICK IS L.T. LIMIT, CONTINUE |
| 00BB | 897F | 174 | KICKBK: | ORL | P1,#7FH | ; *OFF TRIAC* AND TEST SWITCH |
| 00BD | 09 | 175 | | IN | A,P1 | ; |
| 00BE | D2CE | 176 | | JB6 | CYCLE1 | ;IS SWITCH OFF? |
| 00C0 | 04BB | 177 | | JMP | KICKBK | ;SWITCH IS STILL ON |
| | | 178 | | | | ; |
| | | 179 | | | | ;    **OFF TRIAC* |
| 00C2 | B92E | 180 | NOKICK: | MOV | R1,#46 | ;UPDATE OSR |
| 00C4 | B828 | 181 | | MOV | R0,#40 | ; . |
| 00C6 | F1 | 182 | | MOV | A,@R1 | ; |
| 00C7 | A0 | 183 | | MOV | @R0,A | ; |
| 00C8 | 18 | 184 | | INC | R0 | ; |
| 00C9 | 19 | 185 | | INC | R1 | ; |
| 00CA | F1 | 186 | | MOV | A,@R1 | ; |
| 00CB | A0 | 187 | | MOV | @R0,A | ;END OSR UPDATE |
| 00CC | 0475 | 188 | CYCLE: | JMP | IFSWIT | |
| 00CE | 04CE | 189 | CYCLE1: | JMP | CYCLE1 | ;KICK OCCURRED-TURN OFF |
| | | 190 | | END | | |

USER SYMBOLS

| AROUND | 0020 | CLRR | 0054 | CLRRB1 | 005C | CYCLE | 00CC |
|---|---|---|---|---|---|---|---|
| CYCLE1 | 00CE | EXTINT | 0023 | HINSR | 0039 | IFSWIT | 0075 |
| INCNSR | 0031 | JUNK | 0005 | KICKBK | 00BB | KIKCHK | 00B1 |
| NOKICK | 00C2 | REPLTF | 0046 | RESET | 004C | RETUR | 0047 |
| RETURN | 0022 | SHKICK | 007B | START | 004A | TIFLAG | 0043 |
| TINT | 0007 | TRYAGN | 007F | UPNSR | 0012 | | |

ASSEMBLY COMPLETE, NO ERRORS

What is claimed is:

1. In a power tool of the type having an implement driven by a motive power source, the improvement of a system for detecting an impending kickback condition in the power tool comprising:

(a) monitoring means for monitoring the speed of a predetermined part of the power tool;

(b) means connected to said monitoring means for determining the rate of change of the monitored speed; and (c) means for producing a predetermined response when said rate of change attains a determinable value.

2. In a power tool of the type having an implement driven by a motive power source, the improvement of a system for detecting an impending kickback condition in the power tool comprising:

(a) monitoring means for monitoring the speed of a predetermined part of the power tool;

(b) means connected to said monitoring means for determining the rate of change of the monitored speed;

(c) comparing means for comparing the rate of change of the monitored speed with a threshold to detect an impending kickback condition.

3. The improvement of a system for detecting an impending kickback condition in a power tool as recited in claim 2 wherein said monitoring means comprises means for measuring the speed of said implement.

4. The improvement of a system for detecting an impending kickback condition in a power tool as recited in claim 2 wherein said motive power source drives said implement through a transmission and said monitoring means comprises means for measuring the speed of said transmission.

5. The improvement of a system for detecting an impending kickback condition in a power tool as recited in claim 2 wherein said monitoring means comprises means for measuring the speed of said motive power source.

6. In a power tool of the type having an implement driven by a motive power source, the improvement of an anti-kickback control system for said power tool comprising:

(a) monitoring means for generating a signal proportional to the speed of a predetermined part of the power tool;

(b) determining means connected to receive the signal generated by said monitoring means for developing a signal proportional to the rate of change of the signal from said monitoring means;

(c) comparing means connected to receive the signals developed by said measuring means and a threshold signal for producing an output signal whenever the signal developed by said measuring means exceeds said threshold signal; and (d) control means set by the output signal of said comparing means for inhibiting the supply of power to said implement.

7. The anti-kickback control system recited in claim 6 further comprising brake means responsive to said control means for stopping the motion of said implement.

8. The anti-kickback control system as recited in claim 6 further comprising switch means for enabling the supply of power to said tool or other implement from said motive power source.

9. The anti-kickback control system recited in claim 8 wherein said control means is reset by said switch means.

10. In a power tool of the type having a rotary shaft connected to drive an implement and an electric motor coupled to said rotary shaft to impart a rotary motion thereto, said electric motor being adapted to be connected to a source of electrical power through a switching device, the improvement of an anti-kickback control system comprising:

(a) monitoring means for monitoring the speed of rotation of said rotary shaft;

(b) means connected to said monitoring means for measuring the rate of change of the speed of the rotation of said rotary shaft;

(c) comparing means for comparing the measured rate of change of the speed of rotation of said rotary shaft with a threshold; and (d) means connected to said comprising means for controlling said switching device to block the connection of electrical power to said electric motor if the measured rate of change of the speed of rotation of said rotary shaft exceeds said threshold.

11. In a power tool of the type having a rotary shaft connected to drive an implement and a pneumatic motor couple to said rotary shaft to impart a rotary motion thereto, said pneumatic motor being adapted to be connected to a source of compressed air through a valve, the improvement of an anti-kickback control system comprising:

(a) monitoring means for monitoring the speed of rotation of said rotary shaft;

(b) means connected to said monitoring means for measuring the rate of change of the speed of rotation of said rotary shaft;

(c) comparing means for comparing the measured rate of change of the speed of rotation of said rotary shaft with a threshold; and (d) means connected to said comprising means for operating said valve to block the coupling of compressed air to said pneumatic motor if the measured rate of change of the speed of rotation of said rotary shaft exceeds said threshold.

12. In a power tool of the type having a rotary shaft connected to drive an implement and an internal combustion engine coupled to said rotary shaft to impart a rotary motion thereto, said internal combustion engine being coupled to said rotary shaft by means of a clutch, the improvment of an anti-kickback control system comprising:

(a) monitoring means for monitoring the speed of rotation of said rotary shaft;

(b) means connected to said monitoring means for measuring the rate of change of the speed of rotation of said rotary shaft;

(c) comparing means for comparing the measured rate of change of the speed of rotation of said rotary shaft with a threshold; and (d) means connected to said comparing means for operating said clutch to disengage the coupling of power from said internal combustion engine to said rotary shaft if the measured rate of change of the speed of rotation of said rotary shaft exceeds said threshold.

13. The anti-kickback control system as recited in claim 12 wherein said rotary shaft is provided with a brake, said means for operating further actuating said brake simultaneously with the operation of said clutch if the measured rate of change of the speed of rotation of said rotary shaft exceeds said threshold.

14. In a power tool of the type having a rotary shaft connected to drive an implement and a motive power source coupled to said rotary shaft to impart a rotary motion thereto, the improbement of an anti-kickback control system comprising:

(a) a switch which, when closed, generates a reset signal for enabling the supply of power to said rotary shaft from said motive power source;

(b) monitoring means for monitoring the speed of rotation of said rotary shaft to develop a first signal proportional to the speed of rotation of said rotary shaft;

(c) means connected to said monitoring means for generating a second signal proportional to the rate of change of said first signal;

(d) comparing means for comparing said second signal with a threshold signal and developing an output signal whenever said second signal exceeds said threshold signal; and (e) means connected to said comparing means for generating a set signal to inhibit the supply of power to said rotary shaft whenever said output signal is developed.

15. The anti-kickback control system as recited in claim 14 wherein, after the supply of power to said rotary shaft has been inhibited, said switch can be opened and reclosed to develop a reset signal for again enabling the supply of power to said rotary shaft from said motive power source.

16. In a power tool of the type having a rotary shaft connected to an implement and an electric motor coupled to said rotary shaft to impart a rotary motion thereto, said electric motor being adapted to be connected to a source of electrical power through a switching device, the improvement of an anti-kickback control system comprising:

(a) a switch, which when closed, generates a reset signal to said switching device to cause said switching device to connect electrical power to said electric motor;

(b) monitoring means for monitoring the speed of rotation of said rotary shaft to develop a first signal proportional to the speed of rotation of said rotary shaft;

(c) means connected to said monitoring means for generating a second signal proportional to the rate of change of said first signal;

(d) comparing means for comparing said second signal with a threshold signal for developing an output signal whenever said signal exceeds said threshold signal; and (e) means connected to said comparing means for generating a set signal to said switching device to cause said switching device to block power to said electric motor in response to said output signal.

17. The anti-kickback control system as recited in claim 16 wherein, after said set signal has been generated, said switch can be opened and then reclosed to generate a reset signal to said switching device to again connect electrical power to said electric motor.

18. In a power tool of the type having a rotary shaft connected to an implement and a pneumatic motor coupled to said rotary shaft to impart a rotary motion thereto, said pneumatic motor being adapted to be connected to a source of compressed air through a solenoid operated valve, the improvement of an anti-kickback control system comprising:

(a) a switch to generate a reset signal to said solenoid operated valve to cause said valve to couple compressed air to said pneumatic motor;

(b) monitoring means for monitoring the speed of rotation of said rotary shaft to develop a first signal proportional to the speed of rotation of said rotary shaft;

(c) means connected to said monitoring means for generating a second signal proportional to the rate of change of said first signal;

(d) comparing means for comparing said second signal with a threshold signal and developing an output signal whenever said second signal exceeds said threshold signal; and (e) means connected to said comparing means for generating a set signal to said solenoid operated valve to cause said valve to block compressed air to said pneumatic motor in response to said output signal.

19. The anti-kickback control system as recited in claim 18 after said set signal has been generated, said switch can be opened and then reclosed to generate a reset signal to said solenoid operated valve to again couple compressed air to said pneumatic motor.

20. In a power tool of the type having a rotary shaft connected to an implement and an internal combustion engine coupled to said rotary shaft to impart a rotary motion thereto, said internal combustion engine being coupled to said rotary shaft by means of a solenoid operated clutch, the improvement of an anti-kickback control system comprising:

(a) a switch which, when closed, generates a reset signal to said solenoid operated clutch to cause said clutch to couple power from said internal combustion engine to said rotary shaft;

(b) monitoring means for monitoring the speed of rotation of said rotary shaft to develop a first signal proportional to the speed of rotation of said rotary shaft;

(c) means connected to said monitoring for generating a second signal proportional to the rate of change of said first signal;

(d) comparing means for comprising said second signal with a threshold signal and developing an output signal whenever said signal exceeds said threshold signal; and (e) means connected to said comparing means for generating a set signal to said solenoid operated clutch to cause said clutch to disengage the coupling of power from said internal combustion engine to said rotary shaft in response to said output signal.

21. The anti-kickback control system as recited in claim 20 wherein said rotary shaft is provided with a solenoid operated brake responsive to said set signal, said solenoid operated brake operating simultaneously with said solenoid operated clutch to stop the rotary motion of said rotary shaft.

22. The anti-kickback control system as recited in claim 20 wherein, after said set signal has been generated, said switch can be opened and then reclosed to generate a reset signal to said solenoid operated clutch to again couple power from said internal combustion engine to said rotary shaft.

23. In a power tool of the type having an implement driven by a motive power source, the improvement of an anti-kickback control system for said power tool comprising:

(a) monitoring means for monitoring a signal proportional to the speed of a predetermined part of the power tool;

(b) a microprocessor connected to receive the signal from said monitoring means, said microprocessor being programmed to compute the rate of change of the signal from said monitoring means, compare the computed rate of change with a threshold value, and produce an inhibit output signal whenever the computed rate of change exceeds said threshold value; and (c) control means responsive to said inhibit output signal for inhibiting the supply of power to said implement.

24. The anti-kickback control system as recited in claim 23 wherein said motive power source is an electric motor adapted to be connected to a source of electrical power through a switching device, and said control means controls said switching device in response to said inhibit output signal to block the connection of electrical power to said electric motor.

25. In a power tool of the type having a rotary shaft connected to drive an implement and an electric motor coupled to said rotary shaft to impart a rotary motion thereto, said electric motor being adapted to be connected to a source of electrical power through a switching device, the improvement of an anti-kickback control system for said power tool comprising:

(a) a pulse generator for generating pulses having a frequency proportional to the speed of rotation of said rotary shaft;

(b) a microprocessor connected to receive the pulses from said pulse generator, said microprocessor being programmed to compute the speed of rotation of said rotary shaft as a function of elapsed time between pulses from said pulse generator, compute the rate of change of the speed of rotation of said rotary shaft as a function of the difference between elapsed time intervals between successive pulse intervals, compare the computed rate of change with a threshold value, and produce an inhibit output signal whenever the computed rate of change exceeds said threshold value; and (c) control means responsive to said inhibit output signal for controlling said switching device to block the connection of electrical power to said electric motor.

26. A method of detecting an impending kickback condition in a power tool of the type having an implement driven by a motive power source, the method comprising the steps of:

(a) monitoring the speed of a predetermined part of the power tool;

(b) determining the rate of change of the monitoring speed; and (c) producing a predetermined response when said rate of change attains a determinable value.

27. A method of detecting an impending kickback condition in a power tool of the type having an implement driven by a motive power source, the method comprising the steps of:

(a) monitoring the speed of a predetermined part of the power tool;

(b) determining the rate of change of the monitored speed;

(c) comparing the rate of change of the monitored speed to a determinable threshold; and (d) producing a predetermined response when said rate of change bears a predetermined relationship to said threshold.

28. The method of detecting an impending kickback condition as recited in claim 27 wherein the step of monitoring is performed by measuring the speed of said implement.

29. The method of detecting an impending kickback condition as recited in claim 27 wherein said implement is driven by said motive power source through a transmission and the step of monitoring is performed by measuring the speed of said transmission.

30. The method of detecting an impending kickback condition as recited in claim 27 wherein the step of monitoring is performed by measuring the speed of said motive power source.

31. The method of detecting an impending kickback condition as recited in claim 27 further comprising the step of setting said threshold.

32. A method of eliminating kickback in a power tool of the type having an implement driven by a motive power source, the method comprising the steps of:

(a) monitoring the speed of a predetermined part of the power tool;

(b) determining the rate of change of the monitoring speed;

(c) comparing the rate of change of the monitored speed with a threshold; and (d) inhibiting the supply of power to said tool if the rate of change of the monitored speed exceeds said threshold.

33. The method of eliminating kickback in a power tool as recited in claim 32 further comprising the step of applying a brake to stop the motion of said implement if the measured rate of change of the monitored speed exceeds said threshold.

34. A method of eliminating kickback in a power tool of the type having a rotary shaft connected to drive an implement and an electric motor coupled to said rotary shaft to impart a rotary motion thereto, said electric motor being adapted to be connected to a source of electrical power through a switching device, the method comprising the steps of:

(a) monitoring the speed of rotation of said rotary shaft;

(b) measuring the rate of change of the speed of rotation of said rotary shaft;

(c) comparing the measured rate of change of the speed of rotation of said rotary shaft with a threshold; and (d) controlling said switching device to block the connection of electrical power to said electric motor if the measured rate of change of the speed of rotation of said rotary shaft exceeds said threshold.

35. A method of eliminating kickback in a power tool of the type having a rotary shaft connected to drive an implement and a pneumatic motor coupled to said rotary shaft to impart a rotary motion thereto, said pneumatic motor being adapted to be connected to a source of compressed air through a valve, the method comprising the steps of:

(a) monitoring the speed of rotation of said rotary shaft;

(b) measuring the rate of change of the speed of rotation of said rotary shaft;

(c) comparing the measured rate of change of the speed of rotation of said rotary shaft with a threshold; and (d) operating said valve to block the coupling of compressed air to said pneumatic motor if the measured rate of change of the speed of rotation of said rotary shaft exceeds said threshold.

36. A method of eliminating kickback in a power tool of the type having a rotary shaft connected to drive an implement and an internal combustion engine coupled to said rotary shaft to impart a rotary motion thereto, said internal combustion engine being coupled to said rotary shaft by means of a clutch, the method comprising the steps of:
 (a) monitoring the speed of rotation of said rotary shaft;
 (b) measuring the rate of change of the speed of rotation of said rotary shaft;
 (c) comparing the measured rate of change of the speed of rotation of said rotary shaft with a threshold; and
 (d) operating said clutch to disengage the coupling of power from said internal combustion engine to said rotary shaft if the measured rate of change of the speed of rotation of said rotary shaft exceeds said threshold.

37. The method of eliminating kickback in a power tool as recited in claim 36 wherein said rotary shaft is provided with a brake, said method further comprising the step of actuating said brake simultaneously with the operation of said clutch if the measured rate of change of the speed of rotation of said rotary shaft exceeds said threshold.

38. A method of eliminating kickback in a power tool of the type having a rotary shaft connected to drive an implement and a motive power source coupled to said rotary shaft to impart a rotary motion thereto, said method comprising the steps of:
 (a) closing a switch to generate a reset signal for enabling the coupling of power to said rotary shaft from said motive power source;
 (b) monitoring the speed of rotation of said rotary shaft to develop a first signal proportional to the speed of rotation of said rotary shaft;
 (c) generating a second signal proportional to the rate of change of said first signal;
 (d) comparing said second signal with a threshold signal and developing an output signal whenever said second signal exceeds said threshold signal; and
 (e) generating a set signal to inhibit the coupling of power to said rotary shaft from said motive power source whenever said output signal is developed.

39. The method of eliminating kickback in a power tool as recited in claim 38 further comprising the step of opening and closing said switch after coupling of power to said rotary shaft has been inhibited to develop a reset signal for again enabling the coupling of power to said rotary shaft from said motive power source.

40. A method of eliminating kickback in a power tool of the type having a rotary shaft connected to an implement and an electric motor coupled to said rotary shaft to impart a rotary motion thereto, said electric motor being adapted to be connected to a source of electrical power through a switching device, the method comprising the steps of:
 (a) closing a switch to generate a reset signal to said switching device to cause said switching device to connect electrical power to said electric motor;
 (b) monitoring the speed of rotation of said rotary shaft to develop a first signal proportional to the speed of rotation of said rotary shaft;
 (c) generating a second signal proportional to the rate of change of said first signal;
 (d) comparing said second signal with a threshold signal and developing an output signal whenever said second signal exceeds said threshold signal; and
 (e) generating a set signal to said switching device to cause said switching device to block power to said electric motor in response to said output signal.

41. The method of eliminating kickback in a power tool as recited in claim 40 further comprising the step of opening and closing said switch after said set signal has been generated to generate a reset signal to said switching device to again connect electrical power to said electric motor.

42. A method of eliminating kickback in a power tool of the type having a rotary shaft connected to an implement and a pneumatic motor coupled to said rotary shaft to impart a rotary motion thereto, said pneumatic motor being adapted to be connected to a source of compressed air through a solenoid operated valve, the method comprising the steps of:
 (a) closing a switch to generate a reset signal to said solenoid operated valve to cause said valve to couple compressed air to said pneumatic motor;
 (b) monitoring the speed of rotation of said rotary shaft to develop a first signal proportional to the speed of rotation of said rotary shaft;
 (c) generating a second signal proportional to the rate of change of said first signal;
 (d) comparing said second signal with a threshold signal and developing an output signal whenever said second signal exceeds said threshold signal; and
 (e) generating a set signal to said solenoid operated valve to cause said valve to block compressed air to said pneumatic motor in response to said output signal.

43. The method of eliminating kickback in a power tool as recited in claim 42 further comprising the step of opening and closing said switch after said set signal has been generated to generate a reset signal to said solenoid operated valve to again couple compressed air to said pneumatic motor.

44. A method of eliminating kickback in a power tool of the type having a rotary shaft connected to an implement and an internal combustion engine coupled to said rotary shaft to impart a rotary motion thereto, said internal combustion engine being coupled to said rotary shaft by means of a solenoid operated clutch, the method comprising the steps of:
 (a) closing a switch to generate a reset signal to said solenoid operated clutch to cause said clutch to couple power from said internal combustion engine to said rotary shaft;
 (b) monitoring the speed of rotation of said rotary shaft to develop a first signal proportional to the speed of rotation of said rotary shaft;
 (c) generating a second signal proportional to the rate of change of said first signal;
 (d) comparing said second signal with a threshold signal and developing an output signal whenever said second signal exceeds said threshold signal; and
 (e) generating a set signal to said solenoid operated clutch to cause said clutch to disengage the coupling of power from said internal combustion engine to said rotary shaft in response to said output signal.

45. The method of eliminating kickback in a power tool as recited in claim 44 wherein said rotary shaft is provided with a solenoid operated brake and further comprising the step of simultaneously applying said set signal to said brake to stop the rotary motion of said rotary shaft.

46. The method of eliminating kickback in a power tool as recited in claim 44 comprising the step of opening and closing said switch after said set signal has been generated to generate a reset signal to said solenoid operated clutch to again couple power from said internal combustion engine to said rotary shaft.

* * * * *